US012475636B2

(12) United States Patent
Chatterjee et al.

(10) Patent No.: US 12,475,636 B2
(45) Date of Patent: Nov. 18, 2025

(54) RENDERING TWO-DIMENSIONAL IMAGE OF A DYNAMIC THREE-DIMENSIONAL SCENE

(71) Applicant: Mitsubishi Electric Research Laboratories, Inc., Cambridge, MA (US)

(72) Inventors: Moitreya Chatterjee, Somerville, MA (US); Suhas Lohit, Arlington, MA (US); Pedro Miraldo, Cambridge, MA (US)

(73) Assignee: Mitsubishi Electric Research Laboratories, Inc.

( * ) Notice: Subject to any disclaimer, the term of this patent is extended or adjusted under 35 U.S.C. 154(b) by 155 days.

(21) Appl. No.: 18/413,640

(22) Filed: Jan. 16, 2024

(65) Prior Publication Data
US 2025/0232518 A1    Jul. 17, 2025

(51) Int. Cl.
*G06T 15/20* (2011.01)
*G06T 7/246* (2017.01)
*G06T 7/73* (2017.01)

(52) U.S. Cl.
CPC .............. *G06T 15/20* (2013.01); *G06T 7/246* (2017.01); *G06T 7/73* (2017.01); *G06T 2207/20084* (2013.01)

(58) Field of Classification Search
None
See application file for complete search history.

(56) References Cited

U.S. PATENT DOCUMENTS

| 11,748,940 | B1* | 9/2023 | Xian | G06T 15/205 |
| | | | | 345/419 |
| 2024/0420341 | A1* | 12/2024 | Li | G06T 7/90 |
| 2025/0106370 | A1* | 3/2025 | Chen | H04N 21/816 |
| 2025/0182386 | A1* | 6/2025 | Ravi | G06T 17/00 |

OTHER PUBLICATIONS

Pumarola, A., Corona, E., Pons-Moll, G. and Moreno-Noguer, F., 2021. D-nerf: Neural radiance fields for dynamic scenes. In Proceedings of the IEEE/CVF Conference on Computer Vision and Pattern Recognition (pp. 10318-10327).

(Continued)

*Primary Examiner* — Frank S Chen
(74) *Attorney, Agent, or Firm* — Gene Vinokur

(57) ABSTRACT

Embodiments for rendering a 2D image of a dynamic 3D scene from different view angles using a neural radiance field (NeRF) are provided. In this regard, an AI image processing system is configured to process coordinates of a point in a dynamic 3D scene with an RNN over a number of time steps indicated by a time instance of interest to produce motion information of the point at the time instance of interest, process the motion information with a fully connected neural network to produce a displacement of the point from the coordinates in the dynamic 3D scene, and process a displaced point from a view angle of interest with the NeRF to render the point on the 2D image of the dynamic 3D scene at the time instance of interest. The displaced point is generated based on an estimate of the displacement of the point by leveraging motion cues.

20 Claims, 10 Drawing Sheets

(56) References Cited

OTHER PUBLICATIONS

Li, Z., Niklaus, S., Snavely, N. and Wang, O., 2021. Neural scene flow fields for space-time view synthesis of dynamic scenes. In Proceedings of the IEEE/CVF Conference on Computer Vision and Pattern Recognition (pp. 6498-6508).

Du, Y., Zhang, Y., Yu, H.X., Tenenbaum, J.B. and Wu, J., Oct. 2021, Neural radiance flow for 4d view synthesis and video processing. In 2021 IEEE/CVF International Conference on Computer Vision (ICCV) (pp. 14304-14314). IEEE Computer Society.

Shuai, Q., Geng, C., Fang, Q., Peng, S., Shen, W., Zhou, X. and Bao, H., Jul. 2022, Novel view synthesis of human interactions from sparse multi-view videos. In ACM Siggraph 2022 Conference Proceedings (pp. 1-10).

\* cited by examiner

RENDERING TWO-DIMENSIONAL IMAGE OF A DYNAMIC THREE-DIMENSIONAL SCENE

TECHNOLOGICAL FIELD

The present disclosure relates generally to processing of visual data and more specifically to rendering two-dimensional images of a dynamic three-dimensional scene from a novel viewing angle using a neural network.

BACKGROUND

Novel view rendering refers to a process of generating two-dimensional (2D) images or views of a three-dimensional (3D) scene from different perspectives or viewing angles that were not part of original input data. In the context of computer graphics and computer vision, this task involves creating new 2D images of a 3D scene from viewpoints that were not explicitly captured during the initial data acquisition.

One common application of novel view rendering is in virtual reality (VR) and augmented reality (AR) systems. In these systems, a user may move their head or change their position, requiring the generation of new views of the virtual environment to maintain a realistic and immersive experience. Novel view rendering can also be relevant in the context of 3D reconstruction, where the goal is to generate new images of a scene from arbitrary viewpoints based on a limited set of input images.

Various techniques can be used for novel view rendering, including traditional computer graphics and vision-based methods and more recent approaches based on deep learning and neural networks. While computer graphics/vision methods have been widely used for novel view rendering, they come with certain drawbacks. These drawbacks include, but are not limited to, limited realism, sparsity in the recovered 3D scene structure, manual modelling and parameter tuning, limited generalization, limited handling of complex lighting, lack of scene understanding, and computational complexity.

For example, deep learning models, such as neural radiance field networks (NeRFs), can be trained to understand the 3D structure of a scene and generate realistic images of the scene from novel viewpoints. These models learn to capture the spatial relationships and attributes of a 3D scene, allowing them to generalize to unseen views.

Typically, deep learning models have been used for view rendering of a static scene, i.e., when objects are not moving or changing their configuration over time. Moreover, conventional deep learning models for photo-realistic rendering requires manual and computational effort to create scenes and render realistic images.

To this end, in order to fully realize the potential of novel-view rendering methods and to achieve an even broader impact, it is critical to extend the capabilities of view rendering to dynamic scenes as well, i.e., scenes where objects may be changing in position, over time. Most promising approaches for the creation of rendered content for dynamic scenes, usually leverage a deformation field. These are modeled using a Deformation Field Neural Network (DFN). DFNs are designed to handle spatial deformations in scenes, arising due to their dynamic nature. The primary idea behind DFNs is to model and predict deformations of 3D points that may occur between different views or frames in a dynamic 3D scene.

However, these approaches have one major shortcoming, viz. these approaches directly deform the 3D volume, corresponding to each frame of the dynamic 3D scene into a common canonical frame, using the DFN. This poses a challenge from the learning perspective, since the DFN has to learn a wide range of motions, including frames that are temporally distant from the canonical frame, frames that are close-by, and everything in between. In other words, the DFN must be trained in a training dataset that represents a diverse range of deformations and dynamic scenarios that may be encountered during view rendering. Moreover, designing a network that can learn such complex motion patterns is challenging.

SUMMARY

Novel-view rendering of scenes assumes a central role in AR/VR applications. The view renderings may be used for, for example, creating virtual fly around of tourist sites, creating advertising displays of cars, etc. Other applications of novel view renderings include movies, gaming, etc., which permit use cases, like rendering an action sequence from a more visually appealing viewpoint, creating pleasing visualizations of motions of characters, and the like.

Some embodiments of the present disclosure are based on a realization that the novel view rendering task is relatively easier to accomplish if the 3D scene which is being rendered is static, i.e., objects in the 3D scene are not moving or changing their configuration over time. However, this limits the scope of view-rendering technologies. Therefore, to realize the potential of such view-rendering technologies, it is critical to extend the capabilities of these technologies to dynamic scenes as well, such as scenes where objects are changing in position, configuration, etc. with time.

The capability of rendering dynamic scenes from novel views expands the applicability of view-rendering techniques to areas such as movies, gaming, etc., permitting use cases, like rendering an action sequence from a more visually appealing viewpoint, creating pleasing visualizations of motions of characters, etc.

In certain cases, NeRFs-based approaches are used for novel view rendering in 3D dynamic scenes. The NeRF-based approaches may overcome the challenge of sparsity in recovered geometric representations, faced by traditional computer vision based methods, by modeling a function that maps a volumetric representation of a scene to its color and opacity values, as rendered from a certain viewpoint, via deep neural networks. As an example, multilayer perceptron (MLP) is used for mapping the volumetric representation of a scene to its color and opacity values. The capability of NeRF-based approaches to render the scene with details while preserving quality, has resulted in the wide-spread adoption of these techniques for the task of novel-view rendering.

However, these NeRF-based approaches are only well-suited for static scenes, i.e., scenes where objects change neither in their pose nor configuration over time.

It is an objective of the present disclosure to enable effective rendering of 3D scenes from novel views where the scenes are dynamic, i.e., scenes where scene contents or objects change over time.

Some embodiments are based on an understanding that NeRF-based approaches for novel-view rendering in 3D dynamic scenes may model a rendering task in a common frame (known as the canonical frame) and use a deformation field to project 3D volumetric information from all the frames to this common space.

It may be noted, dynamic NeRF approaches build upon the original NeRF approach by extending it to handle dynamic scenes or objects that undergo temporal changes. While the original NeRF is designed for static scenes, dynamic NeRF allows for the representation and rendering of scenes with objects that move or change their appearance over time. In dynamic NeRFs, an underlying idea is to model not only spatial variations in a scene but also temporal changes. This is achieved by introducing an additional temporal dimension to the NeRF representations, making it a function of both space and time. A dynamic NeRF (DNF) model represents radiance or color of a point in space and time, capturing an appearance of the scene or object at different time instances. Often, such a representation is instantiated by having a DFN and a regular NeRF in cascade, with the DFN responsible for estimating the displacement of a 3D point while the NeRF renders this displaced point from the viewing direction provided.

To train the dynamic NeRF model, a dataset is typically required that comprises spatio-temporal information, such as a sequence of images captured over time. Each training sample in the dataset consists of an image, camera pose, and the corresponding timestamp. The dynamic NeRF model parameters are then optimized to minimize differences between rendered images from the dynamic NeRF model and the actual captured images at different time instances. During inference, the dynamic NeRF model can be used to generate novel views of the dynamic scene or object at any point in time. By evaluating a dynamic NeRF model function at different spatio-temporal coordinates, it can render frames that capture the temporal changes and movements in the scene. As an example, dynamic NeRF has implications in various applications, such as virtual reality, augmented reality, robotics, and autonomous driving. It allows for the realistic rendering and synthesis of dynamic scenes, enabling more immersive experiences and accurate simulations of real-world dynamics.

Accordingly, some embodiments are based on an observation that rendering a whole scene using just one DFN is not effective for dynamic scenes where objects in the scenes may be changing in configuration, position, etc. in a myriad ways.

Some embodiments are based on a realization that traditional approaches for novel view rendering of a scene relies on recovering 3D geometry of the scene, given the multiple input views of the scene. However, the reliance of these approaches on matching key points between the input views and lifting them to the 3D space may result in sparsity in the recovered geometric representations as the 3D geometry is recovered only for the matched key points and not for the entire scene. Consequently, performance of these approaches is poor in dynamic scenes.

Some embodiments are based on an understanding that modeling scene dynamics of a dynamic 3D scene via deformation fields has one major shortcoming. In particular, the NeRF-based approaches using the deformation field directly deforms the 3D volume of each of the frames into a common canonical frame, using a deformation neural network (DFN). This poses a challenge from the learning perspective, since the DEN has to learn a wide range of motions, including for frames that are temporally distant from the canonical frame, frames that are close-by, and the other frames that are in between distant and close-by frames.

Accordingly, embodiment of the present disclosure aims to circumvent the issue relating to learning of the wide range of motions for the task of effective rendering of 3D dynamic scenes from novel views. The embodiments of the present disclosure also allow for an interpretable representation of the temporal dynamics of the scene.

As an example, the challenges of estimating displacements of 3D points in a dynamic scene resulted in implementing a solution in which the DFN may be instantiated with a cascade of a recurrent neural network (RNN) and a fully connected neural network (FCNN) trained to estimate the displacement of a point from a specific instance of time to a frame at a common timestamp. An example of such a fully connected neural network is a multilayer perceptron (MLP) which is a feedforward artificial neural network that generates a set of outputs from a set of inputs. An MLP is characterized by several layers of nodes connected as a directed graph between the input and output layers. However, by itself, the MLP may receive coordinates of a point and a time instance of interest and generate the displacement of the point from a common instance of time (usually corresponding to the time instance of the first frame) to a time instance of interest. While the FCNN, such as the MLP, is advantageous to be trained on dynamic scenes, however, by itself the MLP does not consider the notion of time as a part of its architecture.

Some embodiments of the present disclosure are based on a recognition that the architectural deficiency of the MLP, of not modeling the notion of time, can cause it to inaccurately estimate the displacement of points over time. Accordingly, it is an object of some embodiment to address this deficiency.

Some embodiments are based on the realization that while temporal embedding of FCNNs may directly estimate point displacements over an entire time horizon, there is a need to estimate displacements for each point recurrently to better represent time evolution of the dynamics of a dynamic scene. Doing this in such a manner mimics the notion of time in a displacement estimation network.

To that end, some embodiments of the present disclosure are based on an understanding that adding a recurrent neural network (RNN) to the pipeline with an architecture implementing a short-term memory that has a recurrent structure that mimics the evolution of time may overcome the deficiency of the FCNNs. Examples of such recurrent neural networks include gated recurrent units (GRU) acting as a gating mechanism in recurrent neural networks. The GRU can receive coordinates of a point of interest and a time instance of the interest to produce a representation of motion of the coordinates over fixed time steps from the start of time (first frame) till the time instance of the interest. Subsequently, the MLP is modified to receive this representation of motion to produce displacement of the coordinate from the representation.

In such a manner, the notion of time is moved from the FCNN to the RNN, to capture the motion cues more accurately. As a result, the motion can be predicted more accurately over the extended prediction horizons. In addition, due to the internal memory of RNNs, a displacement of a point may be estimated recursively having RNN and FCNN as a unit of recursion.

Some embodiments of the present disclosure are based on a realization that a task of deforming a 3D volume can be thought of as a deformation of a collection of points sampled in a 3D space. Further, a deformation of a 3D point over time amounts to estimating a vector that connects the 3D point at a location in a current time-horizon to its location in a canonical frame time-horizon.

Some embodiments of the present disclosure are based on an understanding that the vector of the 3D point may be decomposed into a piecewise linear fashion, where each of decomposed pieces represent a displacement of the 3D point between two consecutive time horizons.

Further, some embodiments of the present disclosure are based on a realization that a Gated Recurrent Unit-NeRF (G-NeRF) based model may be employed in order to model the movement of a 3D point in a dynamic 3D scene across different time steps.

Accordingly, a deformation network architecture of the G-NeRF based model includes a Gated Recurrent Unit (GRU), and an MLP. As an example, the GRU keeps track of the history of the displacement of the 3D point in past frames, so that future displacement predictions of the 3D point with respect to the motion in the 3D scene can be predicted. To this end, the GRU keeps track of the past displacements of the 3D point while the MLP predicts the displacement of the 3D point either over each of a fixed length time horizon or for a residual time horizon.

In one aspect, an artificial intelligence (AI) image processing system is provided. The AI image processing system employs a neural radiance field (NeRF) to render a two-dimensional (2D) image of a dynamic three-dimensional (3D) scene from different view angles and different instances of time based on an implicit representation of the 3D scene. The AI image processing system comprises at least one processor and a memory having instructions stored thereon that cause the at least one processor of the AI image processing system to process coordinates of a point in a dynamic 3D scene with a recurrent neural network over a number of time steps indicated by a time instance of interest to produce motion information of the point at the time instance of interest. Further, the instructions stored cause the at least one processor to process the motion information with a fully connected neural network to produce a displacement of the point from the coordinates in the dynamic 3D scene and process a displaced point from a view angle of interest with the NeRF trained for a static 3D scene to render the point on the 2D image of the dynamic 3D scene of the time instance of interest. As an example, the displaced point is generated based on the displacement of the point.

According to additional embodiments, the recurrent neural network and the fully connected neural network are executed recursively for multiple instances of time until the time instance of interest is reached, such that a displacement of the point determined during a current iteration is an input to a subsequent iteration.

According to additional embodiments, the recurrent neural network includes gated recurrent units (GRUs), and wherein execution of each of the GRUs corresponds to a motion of the point over a fixed time step.

According to additional embodiments, a maximum number of iterations of the GRUs defines a maximum length of a prediction horizon. Moreover, the recurrent neural network and the fully connected neural network are executed recursively for different instances of time until the time instance of interest is reached, such that a displacement of the point determined during a current iteration is an input to a subsequent iteration.

According to additional embodiments, each recursion operates on a time horizon with a length not greater than the maximum length of the prediction horizon.

According to additional embodiments, the displacement of the point determined during the current iteration is input to the subsequent iteration and is combined with a hidden state at the subsequent iteration using a non-linear mapping.

According to additional embodiments, an output at the current iteration is a function of a current input and a hidden state of the GRU.

According to additional embodiments, the output of the GRU at the current iteration is a non-linear function of a weighted sum of a current input and a hidden state at the current iteration.

According to additional embodiments, the NeRF is trained to implicitly represent 3D geometry and appearance of the 3D scene and learn a continuous 3D function with learnable parameters based on the view angle of interest and the coordinates of the displaced point.

According to additional embodiments, the NeRF is trained using backpropagation through time (BPTT).

According to additional embodiments, the recurrent neural network (RNN) is a bi-directional RNN.

According to additional embodiments, rendering the point on the 2D image of the dynamic 3D scene produces a new view of the dynamic 3D scene.

According to additional embodiments, the point represents a location of an object or its part in the dynamic 3D scene.

In another aspect, an artificial intelligence (AI)-based image processing method is provided. The AI-based image processing method is implemented using an AI image processing system employing a neural radiance field (NeRF) to render a two-dimensional (2D) image of a dynamic three-dimensional (3D) scene from different view angles and different instances of time based on an implicit representation of the 3D scene. The AI-based image processing method comprises processing coordinates of a point in a dynamic 3D scene with a recurrent neural network over a number of time steps indicated by a time instance of interest to produce motion information of the point at the time instance of interest. The AI-based image processing method further comprises processing the motion information with a fully connected neural network to produce a displacement of the point from the coordinates in the dynamic 3D scene and processing a displaced point from a view angle of interest with the NeRF trained for a static 3D scene to render the point on the 2D image of the dynamic 3D scene of the time instance of interest. As an example, the displaced point is generated based on the displacement of the point.

In yet another aspect, a non-transitory computer readable storage medium embodied thereon a program executable by a processor for performing a method. The method comprises processing coordinates of a point in a dynamic 3D scene with a recurrent neural network over a number of time steps indicated by a time instance of interest to produce motion information of the point at the time instance of interest. As an example, a neural radiance field (NeRF) is employed to render a two-dimensional (2D) image of a dynamic three-dimensional (3D) scene from different view angles and different instances of time based on an implicit representation of the 3D scene. The method further comprises processing the motion information with a fully connected neural network to produce a displacement of the point from the coordinates in the dynamic 3D scene and processing a displaced point from a view angle of interest with the NeRF trained for a static 3D scene to render the point on the 2D image of the dynamic 3D scene at the time instance of interest. As an example, the displaced point is generated based on the displacement of the point.

BRIEF DESCRIPTION OF DRAWINGS

The present disclosure is further described in the detailed description section which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

Figure 1:
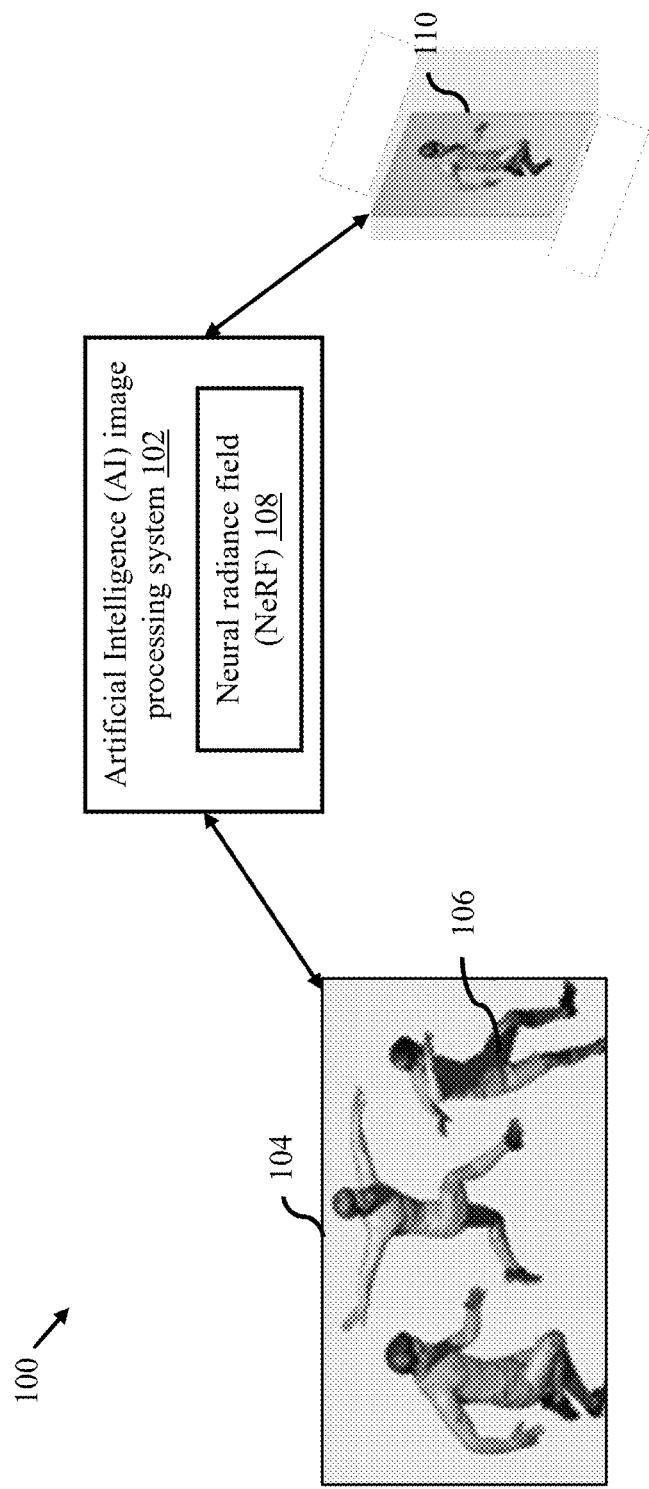
FIG. 1 illustrates an exemplary environment in which an artificial intelligence based image processing system for view rendering in a dynamic scene is implemented, according to one or more embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Overview of Implementation of an Artificial Intelligence (AI) Image Processing System According to Present Disclosure The disclosed AI image processing system comprises a neural radiance field (NeRF) model for 3D scene representation and novel view rendering of dynamic scenes. NeRF models are able to perform view rendering tasks, allowing the synthesis of high-quality images from novel viewpoints. A key principle of the NeRF models is to model a volumetric scene function capturing both the geometry and appearance of a 3D scene. However, NeRFs are typically successful only for view rendering in static scenes and have poor performance in dynamic scene modeling. For example, the traditional NeRF models fail to model deformations of a point in the scene accurately over time.

To this end, the embodiments of the present disclosure provide an AI image processing system for performing novel view rendering in dynamic 3D scenes. As an example, the AI image processing system relies on splitting a displacement estimation task into time horizons or time steps of fixed time units. Further, for each time horizon of time unit, a displacement of a point 'x' is estimated for the time horizon. As an example, a displacement at a current iteration is then used for estimating another displacement for a subsequent time horizon or a subsequent iteration. This process is repeated until a time of interest is reached.

In order to implement the aforementioned steps for view rendering in the dynamic 3D scene, the NeRF model is used. The NeRF model includes a deformation network and a rendering network. For example, the deformation network includes a gated recurrent unit (GRU) or gated recurrent neural network. The proposed NeRF architecture enables modeling of objects in 3D dynamic scenes efficiently for rendering images from novel viewpoints. To this end, using the proposed GRU-based NeRF model allows for interpretable representation of the temporal dynamics of a 3D scene while addressing the challenges associated with large learning or training dataset for wide range of motions which is difficult to capture.

FIG. 1 shows an exemplary environment 100 in which an artificial intelligence (AI) image processing system 102 for view rendering in a dynamic scene 104 is implemented, according to one or more embodiments. Additional, fewer, or other elements may be added to the environment 100.

The AI image processing system 102 (referred to as system 102, hereinafter) is a deep learning neural network. As an example, the system 102 is communicatively connected to the dynamic scene 104, for example, via a sensor (not shown). As an example, the sensor is an optical sensor, such as an image sensor, a camera, a camcorder, etc. The sensor is configured to record or capture image(s), image sequences, or video of the dynamic scene 104.

As an example, the dynamic scene 104 refers to a setting or environment that involves motion, change, and activity over time. For example, the dynamic scene 104 implies the presence of moving objects, interactions, and transformations. The dynamic scene 104 is characterized by their temporal variability and may include elements such as people, vehicles, or any objects (depicted as an object 106) undergoing motion or change.

Pursuant to the present example, the dynamic scene 104 is represented as a soccer match. In this regard, a playing field may be considered as the dynamic scene 104. To this end, moving players may correspond to the dynamic object 106 in the dynamic scene 104. For example, the players on the field are in constant motion due to running, dribbling, and engaging in various activities. Their positions change rapidly, and they interact with each other as they move towards the ball, defend, or attempt to score. Subsequently, these players may form the dynamic objects in the dynamic scene.

Although the present example represents a player as the dynamic object 106, this should not be construed as a limitation. In the dynamic scene 104, there may be other dynamically moving objects on which view rendering may be performed. Examples of such objects may include, but are not limited to, a ball, crowd, camera, etc. Moreover, the representation of the soccer match as the dynamic scene 104 is only exemplary and should not be construed as a limitation. Other examples of the dynamic scene may include, but are not limited to, water bodies (such as waterfall, beaches, ocean, etc.), vehicular traffic on a road segment, locomotives, crowds in an area, city scape. Further, it may be noted that the dynamic scenes may also include static objects, such as trees, buildings, etc. To this end, in certain cases, the embodiments of the present disclosure may also be implemented in static scenes or for rendering images of novel viewpoints of static objects.

Returning to the present example, the dynamic scene 104 involves constant or variable motion of the object 106 over time. Therefore, understanding and accurately representing such dynamic scenes poses challenges for computer vision systems, especially when it comes to tasks like view rendering, as the dynamic scenes evolve over time.

As described above, typical NeRF based models are well-suited for static scenes, however, they fail to accurately model objects in dynamic scenes where scene contents change over time.

For example, the NeRF based models may model a rendering task for novel view rendering in a common or canonical frame and use a deformation field to project the 3D volumetric information from all the frames to the canonical frame. However, this technique faces shortcomings during implementation in dynamic scenes. As the 3D volume of each of the frames is deformed directly into the common canonical frame, this poses a challenge from the learning perspective. Since the deformation field neural network is required to learn a wide range of motions of different possible dynamic objects and for multiple frames of the scene, having a model that can capture the complexities of such motion is difficult. As a result, effective view rendering of scenes from novel views is hampered. As an example, the deformation field neural network estimates erroneous shifts or displacements for a point over long time horizons, resulting in inaccurate view renderings.

Novel-view Synthesis using radiance field models or neural radiance field (NeRF) models have been shown to be highly successful at the task of novel-view synthesis of static scenes. These models learn a mapping from a 3D point, $x \in R3$, and its viewing direction $(\theta, \phi)$ to its color (c) and opacity $(\sigma)$. For example, the opacity provides a measure of how much light passes through the 3D point. This mapping is learnt using a Multi-layer Perceptron (MLP) network, $F_\Theta$, defined as:

$$F_\Theta: (x, \theta, \phi) \to (c, \sigma) \qquad (1)$$

In certain cases, the parameters of the MLP network are trained to minimize photometric reconstruction loss of the scene in a given set of views. While the initial design of the NeRF models having MLP network had several challenges, including slow training and inference speed, inability to deal with scenes that had objects at varying depths, etc.

Some embodiments are based on a realization that Kilo-NeRF models can be used to fix speed-related issues in the traditional architecture of the NeRF models. In this regard, the scene may be split into several parts and each part may be rendered using a separate but much smaller NeRF. In certain cases, the MLP network may be removed from the NeRF models altogether to optimize the opacity and view-dependent color using spherical harmonics directly on a 3D voxel grid. In certain other examples, the voxel grid may be decomposed into sets of 2D planes for projecting the 3D point onto these 2D planes. In order to implement any of the above-mentioned techniques in the traditional NeRF models, a mapping is learnt on a grid on each of these 2D planes which yields the color and opacity values of the 3D point given the viewing direction by synthesizing the output from each of the 2D planes. However, the scenes dealt with by these methods are static in nature, meaning the objects present in the scene do not change their position and/or configuration over time. This presents a handicap in extending these methods to scenes with motion in them.

In certain cases, neural radiance fields for dynamic scenes (D-NeRFs) may be used for rendering dynamic scenes from novel views. In this regard, the dynamic scenes may include objects that change in position, configuration, potentially shape, and other attributes over time. In D-NeRF models, there have been two broad strands of work. In a first approach, a displacement of a 3D point is explicitly modeled over time using a deformation field neural network and the displaced point is rendered through a standard NeRF model. As an example, the deformation field neural network, $\Psi_t$, in such an approach may be represented as:

$$\Psi_t: (X, t) \to X' \qquad (2)$$

Further, the standard NeRF model learns the mapping on the displaced point and a given viewing direction. The mapping may be learnt as:

$$F_\Theta: (X', \theta, \phi) \to (c, \sigma) \qquad (3)$$

Alternatively, in a second approach, an encoding of time is fed as an input to a standard NeRF model. While in the first approach, the displacements of every point of the object in the scene are modelled explicitly, in the second approach, the displacements of every point are implicitly learnt. Subsequently, the mapping in the second approach may be represented or learnt as:

$$F_\Theta: (x, f(t), \theta, \phi) \to (c, \sigma) \qquad (4)$$

where $f(\bullet)$ denotes some encoding of the timestamp of a current time frame, t. As an example, positional encodings are used to encode the time information.

To this end, some prior works have attempted to mitigate the challenges of modeling dynamic scenes by decoupling a task of novel-view rendering of dynamic scenes into two sub-tasks. In the first sub-task, a displacement in a position of a 3D point in a scene is estimated over time. Next, a shifted point is rendered from a novel-view using standard NeRF-based approaches.

Further, certain approaches that seek to improve the rendering of dynamic scenes have sought to use motion cues and/or disentangled semantics of the scene to derive an improved representation of the dynamic scene. The one common element amongst all of these aforementioned approaches for dynamic scene rendering is that they resort to the two-stage rendering pipeline. In the first stage, a displacement in a location of a point in the scene in 3D coordinates is estimated, while in the second stage, an appearance of this point from a desired view angle is predicted. As a result, the conventional dynamic NeRF architectures are decoupled into pixel displacement (or deformation network) and static NeRF. Herein, all motion predictions are encapsulated by the deformation network that triggers the static NeRF for displaced pixels.

While these approaches present promising initial directions for modeling dynamic scenes, the task of capturing all sorts of displacements over any range of time (short or long) makes this learning task challenging and prone to errors and inefficient. Whether the mapping between 3D point and opacity and color is modeled explicitly through a deformation network or implicitly, learning the displacements of all moving points in a scene possibly belonging to many different kinds of objects is difficult.

In certain cases, the dynamic scene may be disentangled by modeling every object in the scene using a separate dynamic NeRF. However, this approach, like other deformation network based dynamic NeRF techniques, attempts to directly learn the displacement of a 3D point, given a time step. Therefore, this approach may also fail to model the deformation of the point accurately.

To this end, estimating displacements of 3D points in a scene for dynamic NeRF can be challenging due to several reasons. For example, the Dynamic NeRFs requires a dataset with spatio-temporal information, including a sequence of images captured over time. However, obtaining such datasets with ground truth 3D point displacements can be difficult and time-consuming. Acquiring accurate ground truth data for dynamic scenes often involves complex motion capture systems or specialized equipment. Moreover, estimating motion and displacements of 3D points from a sequence of images is an ill-posed problem. Thus, designing a model that can undertake this task successfully is difficult. For example, multiple 3D motions may explain the same 2D motion observed in the images leading to ambiguity in motion estimation. This ambiguity makes it challenging to accurately infer the displacements of 3D points in the scene during training as well as inference. In addition, dynamic scenes often involve occlusions, fast motions, deformations, and other complex dynamics. These factors introduce additional challenges in estimating accurate point displacements. For example, occlusions can hinder visibility of certain points in the scene, making it difficult to track their motion accurately, while fast motions and deformations may cause significant changes in appearance of objects, further complicating the estimation of point displacements. Further, dynamic scenes may contain non-rigid and deformable objects, such as humans or animals. In this regard, estimating displacements of such objects require modeling their complex deformations accounting for their varying shapes and appearances over time. Therefore, capturing and modeling the deformations accurately is a challenging task, especially for highly flexible and articulated objects.

Accordingly, an objective of the embodiments of the present disclosure is to provide techniques to accurately model deformation of the 3D points in dynamic scenes over time.

Pursuant to present embodiments, the system 102 is configured to use a NeRF 108 (also referred to as NeRF model 108 or NeRF network 108) to render two-dimensional (2D) image(s) 110 of the object 106 in the dynamic scene 104 or the dynamic scene from novel or different viewpoints.

As an example, the NeRF 108 is implemented in conjunction with a recurrent neural network and a fully connected neural network. To this end, the system 102 is configured to undertake a displacement estimation task in time horizons of fixed time units of C frames. Further, the system 102 is configured to estimate a displacement of a 3D point for each of these time horizons separately. Based on the final displaced point, a viewing angle of interest and a time of interest, an image, or a view of the object from a novel viewpoint is generated. Details of the system 102 are further described in conjunction with, for example, FIG. 2.

Figure 2:
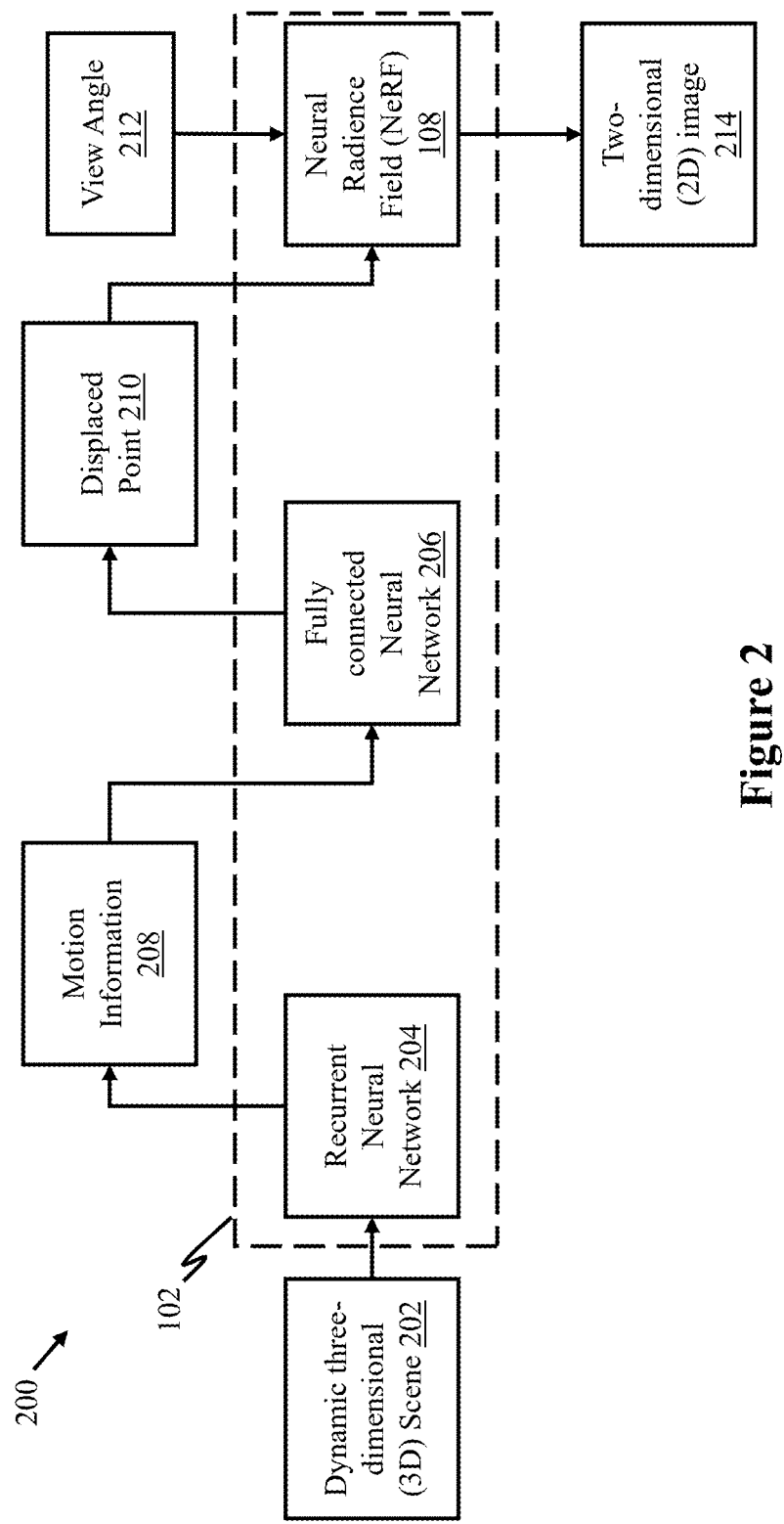
FIG. 2 illustrates a block diagram of the system of FIG. 1, according to one or more embodiments.

FIG. 2 illustrates a block diagram 200 of the AI image processing system 102, according to an example embodiment. The AI image processing system 102 employs the NeRF 108 to render a 2D image 214 of a dynamic 3D scene. As an example, the dynamic 3D scene may correspond to a video game scene, a real-world scene, or an augmented reality scene. The dynamic 3D scene, such as the dynamic scene 104 may include moving objects that may change their position and/or configuration over time.

To this end, the system 102 is configured to render the 2D image 214 of the 3D scene from different view angles and different instances of time based on an implicit representation of the 3D scene.

As an example, the implicit representation refers to a mathematical description or model of an object or a scene that does not explicitly define the object's surface or boundaries. In implicit representation, the object is represented through an implicit function that can determine whether a given point is inside or outside the object. As an example, the implicit representation is defined as a function $F(x,y,z)$ in three-dimensional space, where $(x,y,z)$ are coordinates of a point of the scene or the object. A sign of a value of the function at a particular point indicates whether that point is inside or outside the object. For example, if $F(x,y,z)>0$, the point is outside the object; if $F(x,y,z)<0$, the point is inside the object; and if $F(x,y,z)=0$, the point is on the object's surface.

As an example, the system 102 comprises a recurrent neural network (RNN) 204, a fully connected neural network (FCNN) 206 and the NeRF 108.

As an example, the RNN 204 is configured to process sequential data by maintaining hidden states that capture information from previous time steps. The RNN 204 may include loops that allow information to be carried across different time steps, making them suitable for tasks involving sequences and capturing dependencies across time steps. Subsequently, the RNN 204 is configured to determine displacements of a point in different time-steps or time horizons. As an example, the RNN 204 is implemented as a gated recurrent unit (GRU), long-short-term memory (LSTM), temporal convolution networks (TCN), and the like.

Moreover, the FCNN 206 is a feedforward neural network where each neuron in one layer is connected to every neuron in the next layer without any skips or connections within the same layer. The FCNN 206 is configured to enable mapping between a viewing point or a viewing angle of interest for the object or the scene and parameters, such as color and opacity, for the scene. Examples of the FCNN 206 may include, but are not limited to, multilayer perceptrons (MLPs).

Continuing further, the NeRF 108 is configured to represent and render 3D scenes, particularly, render the image 214 of the dynamic scene from a novel viewing angle and a time of interest. As an example, the NeRF 108 is configured to model a volumetric scene function to capture both geometry and appearance of a 3D scene. The NeRF 108 may represent the 3D scene implicitly for predicting radiance values for any 3D point in the scene. To this end, the NeRF 108 may generate realistic images from novel viewpoints for the dynamic 3D scene.

In operation, the system 102 may receive a dynamic 3D scene 202. A static 3D scene may actually relate to the dynamic 3D scene 202 (referred to as 3D scene 202, hereinafter), where the static 3D scene may be an image of the dynamic 3D scene, captured at a certain point in time.

The 3D scene 202 is fed to the RNN 204 for processing. As an example, the RNN 204 is configured to process coordinates, say x, of a point in the 3D scene 202 over a number of time steps. The number of time steps for processing is indicated by a time instance of interest. As an example, the time instance of interest may specify a time instance for which an image of the dynamic scene is to be generated. Subsequently, a prediction horizon $\{1, \ldots, t\}$ between the time instance, t, and a current time instance associated with capture of the 3D scene 202 is segmented into different time steps or time horizons of a fixed length, $\Delta t$, where a last time horizon or residual time horizon may span over a residual amount of time, i.e., the residual time horizon may have a length of time$\leq \Delta t$, to reach the time instance, t. Further, for each time step or time horizon, a displacement of the point is estimated until the time instance of interest is reached. In this manner, motion information 208 for the point in the 3D scene 202 is estimated as displacements over various time horizons or time steps. Similarly, motion information 208 is determined for each point in the 3D scene 202.

According to embodiments of the present disclosure, the RNN 204 may include or may be implemented as a gated recurrent unit (GRU). To this end, execution of each iteration of the GRU may correspond to a motion of the point at a one-time step. As an example, each iteration of the GRU may generate displacement for the point in one corresponding time step. Subsequently, the final iteration of the GRU may indicate the displacement of the point for the time instance of interest, t.

Continuing further, the motion information 208 is fed to the FCNN 206. As an example, the FCNN 206 is configured to process the motion information 208 to produce a displacement of the point from the coordinates in the 3D scene 202. For example, based on the output of the RNN 204 or the motion information 208, the FCNN 206 is configured to predict a displacement of location or coordinates of the point in the scene after being displaced from a current time instance to the time instance of interest. In this manner, the FCNN 206 determines a new location, such as point coordinates, for the point at the time instance of interest. Subsequently, based on the new location or new point coordinates, the point may be displaced. Once displaced, the point (now referred to as a displaced point 210) is fed to the NeRF 108. As an example, the displaced point 210 is generated based on the displacement(s) of the point across the different time horizons or time steps.

As an example, the RNN 204 and the FCNN 206 are executed recursively for different instances of time until the time instance of interest is reached. In other words, for each of the different time horizons, the RNN 204 is executed to generate the motion information 208 for corresponding time horizon and the FCNN 206 is executed on the generated motion information to generate a displacement of the point for the corresponding time horizon. Accordingly, displacements of the point are calculated in each of the different time horizons or time steps. Subsequently, is the displaced point as determined during a current iteration or a current time horizon is an input to a subsequent iteration or a subsequent time horizon. To this end, the displaced point 210 is produced for the time instance of interest based on the displacements generated in each iteration corresponding to the different time horizons spanning the prediction horizon.

Thereafter, the NeRF 108 is configured to process the displaced point 210 from a view angle of interest, $\theta, \phi$, 212. As an example, the NeRF 108 is trained for the 3D scene 202 to render the displaced point 210 on the 2D image 214 of the dynamic 3D scene at the time of interest, t. In particular, the NeRF 108 is trained specifically on the 3D scene 202 at time instance t in order to enable the NeRF 108 to accurately model the points of the 3D scene 202 within the image 214 that is generated from a novel view angle of interest 212. Subsequently, using the 3D scene 202 other points can be reliably displaced and rendered from a desired view angle and the desired time instance of interest without requiring training of the model on a large dataset corresponding to motions of various objects in the dynamic scene in one shot or one go.

As an example, rendering the point or the displaced point 210 on the 2D image 214 of the dynamic 3D scene produces a new view of the 3D scene. For example, as the displaced point 210 is processed based on the view angle of interest and the time instance of interest, therefore, the point is updated so as to correspond to a new view in the modified scene. As a result, rendering the displaced point 210 that is processed based on the view angle of interest produces a new view of the 3D scene.

Overview of Recurrent Neural Network

Figure 3A:
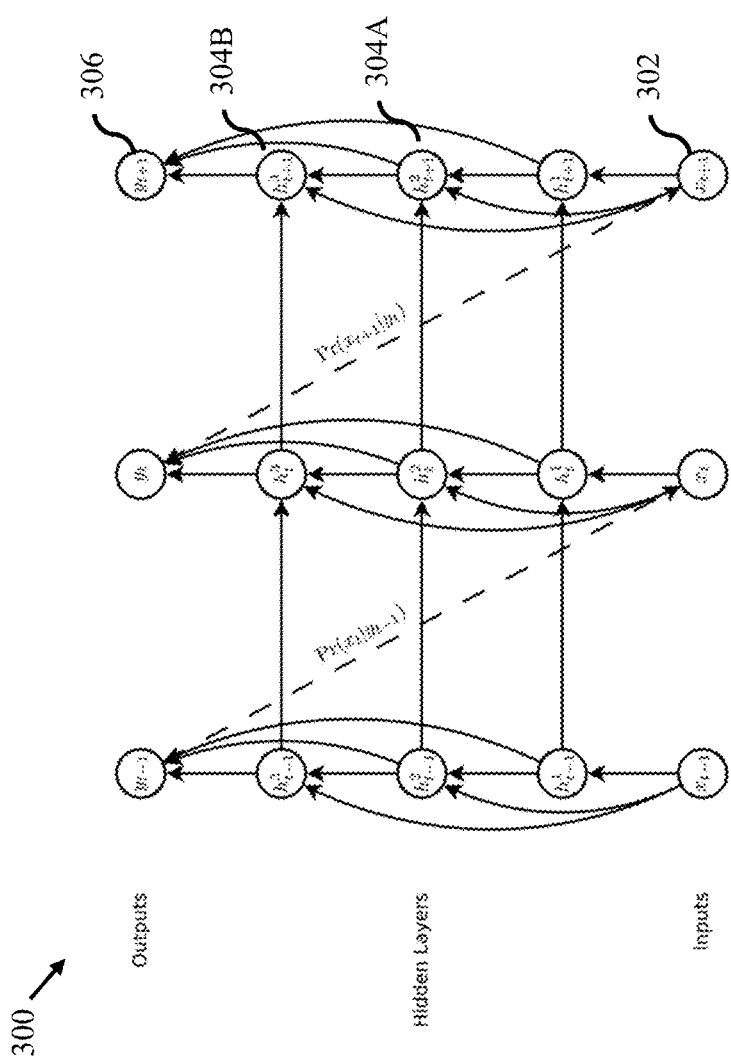
FIG. 3A illustrates an example architecture of a recurrent neural network (RNN), according to one or more embodiments.

FIG. 3A illustrates an example architecture 300 of a recurrent neural network (RNN). The RNN is a type of feedforward neural network. The RNN is capable of anticipating, handling, and modeling sequential and temporal data. The architecture 300 corresponds to the RNN 204 in an embodiment described herein.

Typically, the RNN includes an input layer 302, a number of hidden layers (depicted as hidden layers 304A and 304B, collectively referred to as hidden layers 304), and an output layer 306. In particular, the RNN may include a chain of repeating neural network modules, known as cells, where each cell takes an input from a current time step and an output of a previous time step. This allows RNNs to capture dependencies and patterns in sequential data.

As an example, the hidden layers 304 of the RNN is configured to remember specific information about a sequence. These hidden layers 304 allow past outputs to be used as inputs and store information about a sequence including time sequence. As an example, the information in recurrent neural networks may cycle through a loop in the middle hidden layers 304.

As an example, the input layer 302 receives and pre-processes an input of RNN before passing it on to the hidden layers 304. Further, multiple hidden layers 304 may form a middle layer of the RNN. For example, each hidden layer 304A or 304B may have its corresponding activation function, weights, and biases. For example, the different activation functions, weights, and biases of the hidden layers 304 may be standardized to ensure that each hidden layer has same characteristics. As an example, the activation functions used in the hidden layer 304 of the RNN may be, for example, sigmoid function, tanh function, or rectified linear unit (ReLU) function.

It may be noted, the number of hidden layers 304 to be two is only exemplary. In certain cases, there may be a single hidden layer with a loop over it for a pre-defined number of times. In certain other cases, each different layer of the multiple hidden layers may have corresponding loops for a pre-defined number of times.

For example, information may traverse in an RNN cycle via a loop. To this end, before making a judgment or a prediction, the RNN evaluates a current input as well as what it has learned from past inputs, i.e., outputs of past inputs. For example, the RNN may recall past outputs due to internal memory to produce an output for the current iteration.

As an example, the input layer 302 may take an input vector as the input. The input vector may represent input data at a current time step. Further, the output layer 306 produces an output vector that serves as a prediction of the hidden state for the time step of interest. The recurrent connection among the hidden layers 304 allows information or output from previous layers or time steps previous to the time step of interest to influence the prediction for the time step of interest.

The RNN may be trained using, for example, backpropagation through time (BPTT), gradient clipping, loss functions, or a combination thereof. As an example, during the training of the RNN through BPTT, a backpropagation algorithm is applied to the RNN with time series data as its input for training. For example, typically, a single input is sent into the input layer 302 at a time in the RNN and a single output is obtained. However, during backpropagation, both the current and prior inputs are used. Subsequently, one time step may include multiple time series data points entering the RNN at the same time. Thereafter, an output of the RNN from the output layer is used to calculate and collect the errors once it has predicted the output on time-series data. The RNN is then rolled back up, and its weights are recalculated and adjusted to account for the faults or errors.

Examples of different types of RNNs include, but are not limited to, vanilla RNN, long short-term memory (LSTM), and gated recurrent unit (GRU). The typical vanilla RNNs suffer from the vanishing gradient problem, limiting their ability to capture long-range dependencies. Further, while LSTMs address the vanishing gradient problem by introducing memory cells and gating mechanisms in order to selectively remember or forget information, however, they can be complex to model.

Some embodiments are based on a realization that RNNs have been widely used for modeling time-series data. RNNs may operate in an auto-regressive manner. For example, at each time step, t, the RNN accepts an input $x_t$ and combines it with its hidden state $h_{t-1}$ indicative of the previous inputs using a non-linear mapping, R, along with trainable parameters, $\phi$, to produce an output $y_t$. The process of generating output, for example, for the rendering image task of the dynamic scene 104 is performed until the time instance of interest is reached, i.e., for each time-step $t \in \{1, \ldots, T\}$.

According to embodiments of the present disclosure, the RNN is trained by back-propagating gradients through each of the time steps from the time instance of interest to the start, using a method known as backpropagation through time (BPTT). For example, the Vanilla RNNs only process an input sequence or input vector in a forward or a backward direction. To this end, the RNN used in the present disclosure may be a Bi-Directional RNN, a variant of the vanilla RNN, that may process the input sequence or the input vector in both directions.

Pursuant to an example embodiment, the RNN 204 for the system 102 is implemented using the GRU. The GRUs are a simplified version of LSTMs, offering a balance between efficiency and performance with fewer parameters. Details of GRU are described in conjunction with, for example, FIG. 3B.

Overview of Gated Recurrent Unit

Figure 3B:
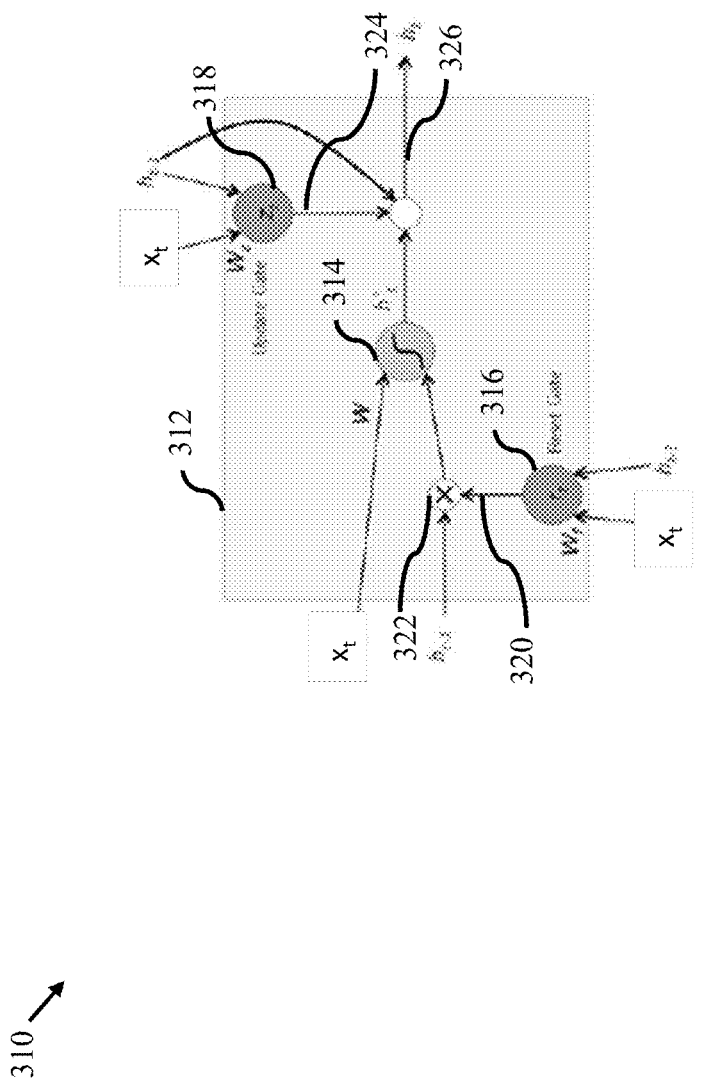
FIG. 3B illustrates an example architecture of a gated recurrent unit (GRU) according to one or more embodiments.

Referring to FIG. 3B, an example architecture 310 of a gated recurrent unit 312 is illustrated, according to some embodiments of the present disclosure. The GRU 312 is a type of recurrent neural network (RNN) and may provide a simpler alternative to LSTM networks. The GRU 312 is capable of processing sequential data such as text, speech, and time-series data.

As an example, the GRU 312 may use gating mechanisms to selectively update a hidden layer, such as the hidden layer 304A or 304B, of the GRU 312 at each time step. As an example, in the GRU 312, an output, $y_t$, at a particular time-step is a function of an input, $x_t$, at corresponding time step and a hidden state, $h_{t-1}$, of the GRU 312 for a timestep previous to the particular time-step.

Further, the GRU 312 may have two gating mechanisms, namely, a reset gate 316 and an update gate 318. The gating mechanisms are used to control a flow of information in and out of the GRU 312. As an example, an output of the reset gate 316 and the update gate is a non-linear function of a weighted sum of the current input, $x_t$, and the hidden state, $h_{t-1}$.

For example, the reset gate 316 determines how much of previous hidden states, $h_{t-1}$, should be forgotten. Moreover, the update gate 318 determines how much of the new input, $x_t$, should be used to update the hidden layers 304 or the hidden state. As an example, an output of these gates is a non-linear function of a weighted sum of the current input and the hidden state. Further, a sequence of operations in the GRU 312 is given by:

$$r_t = \sigma\left(W_r\left(\frac{x_t}{h_{t-1}}\right)\right) + b_r, \quad (5)$$

$$h'_t = \tanh\left(W\left(\frac{x_t}{r_t \otimes h_{t-1}}\right)\right), \quad (6)$$

$$z_t = \sigma\left(W_z\left(\frac{x_t}{h_{t-1}}\right)\right) + b_z, \quad (7)$$

$$h_t = (1 - z_t) \otimes h_{t-1} + z_t \otimes h'_t, \quad (8)$$

where $W_r$, $W_z$ and $W$ are learnable weight matrices, while $b_r$, $b_z$ and learnable biases. Moreover, $\otimes$ denotes an element-wise product, and $\sigma$ denotes a sigmoid activation function.

Accordingly, pursuant to present embodiments, the GRU 312 uses the gating mechanism to selectively update the hidden state at each time step, allowing them to effectively model sequential data. In operation, the GRU 312 may take as input the current input, $x_t$, and the previous hidden state, $h_{t-1}$, as vectors. Thereafter, the GRU 312 is configured to calculate the values of the different gates. For example, for each gate, a parameterized current input and previous hidden state vectors are calculated by performing element-wise multiplication 314. As an example, the element wise multiplication 314 is performed using Hadamard product operation. Further, the element wise multiplication is performed between the concerned input vector, $x_t$, and the respective weights, $W_r$, and $W_z$ for each gate. Further, the respective activation function for each gate is applied for element-wise multiplication 314 on the parameterized vectors, $x_t$.

In order to calculate the current hidden state, an output 320, rt, of the reset gate 316 is calculated based on the current input, $x_t$, the hidden state for the previous time step, $h_{t-1}$, and the learnable parameter, $W_r$, of the reset gate 316. The output 320 is multiplied 322 with the hidden state for the previous time step, $h_{t-1}$, to obtain a parameterized vector representation of the output from the reset gate 316. Then element wise multiplication 314 is performed between the input vector, $x_t$, and the parameterized vector from the reset gate 316. Based on the element wise multiplication 314, an adaptation of the current timestep hidden state vector, $h_t'$, is generated. Thereafter, an output, $z_t$ 324 from the update gate 318 is calculated based on the current input, $x_t$, the hidden state, $h_{t-1}$, for the previous time step and the learnable parameter, $W_z$, of the update gate 318. Finally, the output 324 of the update gate 318 is added to the previous hidden state vector to determine the current hidden state vector, $h_t$, 326.

Overview of Neural Radiance Field (NeRF)

Figure 3C:
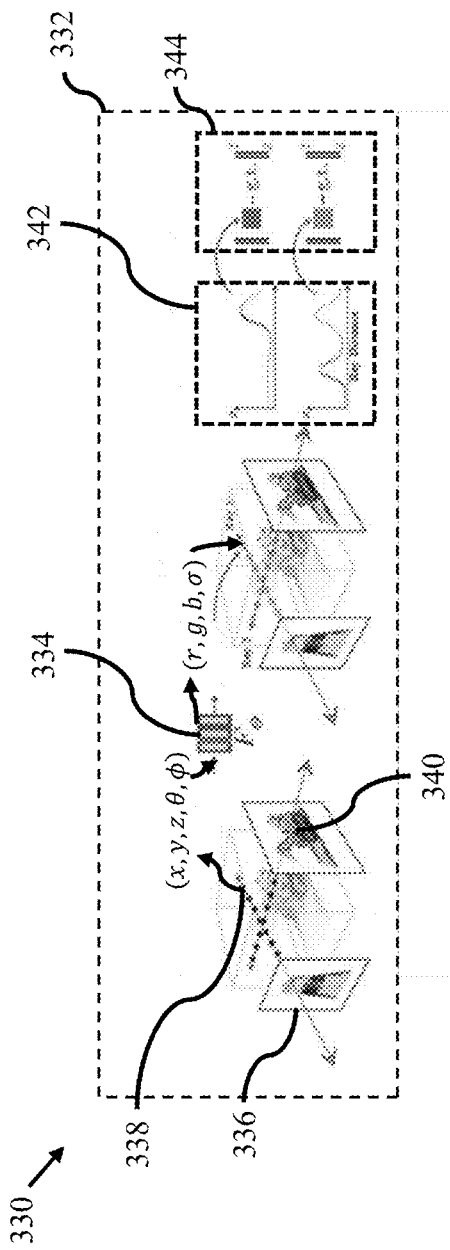
FIG. 3C illustrates an example architecture of a NeRF, according to one or more embodiments.

FIG. 3C illustrates an example architecture 330 of a Neural Radiance Field (NeRF) 332, according to some embodiments. As an example, NeRF 332 is a neural network configured to parameterize a signal. The signal may correspond to a single 3D scene or an object. To this end, a neural field may embed the scene into weights of the NeRF 332 to overfit the NeRF to the particular scene.

Typically, 3D scenes are stored using voxel grids or polygon meshes. While storing voxel grids is expensive, the polygon meshes may only represent hard surfaces that may be unfit for certain cases, such as medical scene examination or medical imaging. In order to overcome the aforementioned challenges associated with storing the 3D scenes, the NeRF 332 is used. In particular, the NeRF 332 is configured to efficiently and compactly generate and store 3D representations of objects or scenes. The 3D representations are differentiable and continuous and may have arbitrary dimensions and resolution. Moreover, NeRF 332 is domain-agnostic, i.e., does not depend on input for each task.

According to an example embodiment, a task of novel-view rendering entails creating a new view of a scene, which has not been provided to a system. The NeRF may rely on a principle of representing 3D geometry and appearance of a scene implicitly through a deep neural network 334. Subsequently, the NeRF 332 is represented mathematically as follows:

Given coordinates $x \in R^3$ of a point in a 3D scene, and its viewing direction $(\theta, \phi)$, the NeRF 332 is configured to learn a continuous 3D function, $F_\Theta$, that may be represented using the deep neural network 334 or an MLP. The deep neural network 334 may include or may be represented with learnable parameters $\Theta$, which maps the coordinates, x, of the point to its color, c, and opacity, $\sigma$. The deep neural network 334 of the NeRF 332 is then trained through back-propagation based methods, such as ADAM.

In accordance with an example, the 3D function, $F_\Theta$, may be represented as:

$$F_\Theta: (x, \theta, \phi) \to (c, \sigma) \quad (9)$$

It may be noted, the NeRF 332 is widely used for solving view synthesis tasks. As an example, the view synthesis task is a task in which a 3D object or a scene is to be generated given a set of pictures from different angles (or views).

In operation, the NeRF 332 is configured to sample coordinates of a scene and feed the sampled coordinates to the deep neural network 334 to produce field quantities. In this regard, the NeRF 332 is configured to accept a single continuous 3D coordinate of a point 338 of a scene 336 or an object 340 in the scene 336, and two viewing angles as input. The 5D coordinate may include a spatial location, (x,y,z), of the point 338, a viewing direction, $(\theta,\phi)$, of the point 338. Thereafter, sampled 3D coordinates, (x,y,z), of the point 338 and the viewing direction $(\theta,\phi)$ are fed to the deep neural network 334. As an example, the point 338 represents a location of the object 340 in the 3D scene 336.

Further, the deep neural network 334 is configured to output color intensities, c, and opacity or volume density, $\sigma$, corresponding to the point 338. These output color intensities, c, and opacity or volume density, $\sigma$, are referred to as the field quantities. For example, the output color intensities, c, may include r, g, b values for the point 338. Moreover, the opacity, $\sigma$, indicates how much radiance (or luminance) is accumulated by a ray passing through the spatial location, (x,y,z), of the point 338. For example, the opacity, $\sigma$, may provide a measure of an effect that the point 338 may have on the rendering of the overall scene 336, and may also be indicative of the predicted color values, r, g, b values.

To this end, the NeRF 332 is configured to predict the field quantities, c,$\sigma$, from a desired reconstruction domain, such as a desired view angle of the problem, for example, view rendering problem or view rendering task. Thereafter, the NeRF 332 is configured to map the reconstruction back to a sensor domain, for example, to generate 2D RGB images of the scene from novel or desired view angles. In this manner, the NeRF 332 may output different representations for the same point 338 when viewed from different angles. As a result, The NeRF 332 may capture various lighting effects such as reflections, and transparencies, making it ideal to render different views of the same scene 336.

During a training of the NeRF 332, the NeRF 332 may calculate a reconstruction loss and optimize the deep neural network 334. In this regard, typically, a target opacity and color are not known for the point 338. Therefore, a differentiable method may be used to map the generated field quantities c,$\sigma$ back to the 2D images. These images are then compared with the ground truth images, such as the scene images, for formulating the rendering loss against which the deep neural network 334 is re-trained.

As an example, volume rendering is used to generate a mapping 342 between the field quantities c,$\sigma$, and back to the 2D image. For example, the mapping 342 includes a first mapping corresponding to points on a ray 1 and a second mapping corresponding to points on ray 2. In this manner, based on the generated field quantities for each point in the different rays passing through the scene 336 and/or the object 340 in the scene, the mapping or the volume render is generated. Based on the volume render mapping 342, a standard reconstruction loss 344 for each ray is computed. As an example, the reconstruction loss 344 is computed using the input image(s) of the scene 336 using an autoencoder. Based on the reconstruction loss 344, the deep neural network 334 may be trained, re-trained or optimized to generate and render realistic image(s) of the scene 336 and/or the object 340 from novel view angles.

Overview of Process of Rendering Dynamic Scenes from Novel View Angles

Figure 4:
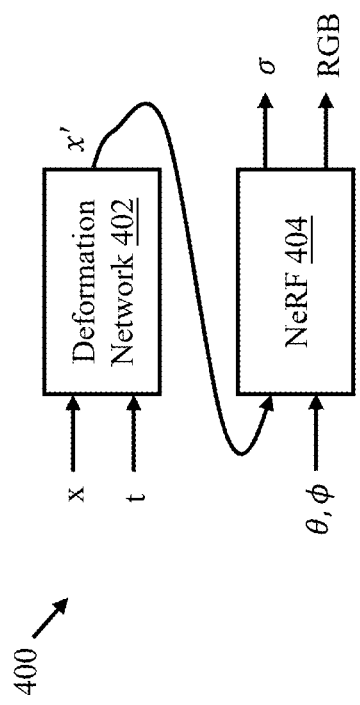
FIG. 4 illustrates a block diagram of a NeRF-based approach for rendering 2D images of a dynamic scene.

A NeRF can also be extended to render dynamic scenes from novel viewing angles. Referring to FIG. 4, a block diagram 400 of an approach for rendering 2D image 214 of a dynamic scene is illustrated. As an example, for a given point, such as the point 338 indicated by $x \in \mathbb{R}^3$, in a 3D scene 336, its desired viewing direction, $\theta, \phi$, and a time instance of interest, t, at which the point 338 is to be rendered is used to deform the point 338 to a new location or to new coordinates. Based on the new location or coordinates in the dynamic scene and novel view angles, $\theta$, and positions, $\phi$, 2D images or frames, such as the 2D image 214 of the dynamic scene from novel viewing direction is generated. To this end, rendering dynamic scenes involves generating images or frames of a 3D scene as it evolves over time and from different or novel perspectives.

As an example, typically, rendering of the dynamic scene is performed by using a deformation network 402 coupled to a NeRF 404. In this regard, the deformation network 402, represented as, $\psi_t$, is configured to map the coordinates, x, of the point 338 to a common canonical space, x', such that $x' \in \mathbb{R}^3$, based on the time instance of interest. This may be represented mathematically, as:

$$\psi_t: (x, t) \to x'$$

Further, the NeRF 404 is then trained on the relocated coordinates, x', of the point to render the relocated point from a given viewing direction, $\theta, \phi$. After the training, the NeRF 404 is configured to generate the color and opacity values for the relocated point.

In other approaches for rendering dynamic scenes, an embedding network (not shown) may encode the current time-step number, $t \in \mathbb{Z}$, into a latent space, $e_t \in \mathbb{R}^d$. Thereafter, the encoding of the time step is fed to the NeRF 404 as follows:

$$F_\Theta: (x, \theta, \phi, e_t) \to (c, \sigma)$$

The network in both of these approaches may be trained through back propagation. However, as the typical deformation network 402 directly converts the point into canonical form, the deformation network 402 may have to learn a wide range of motions, including for frames that are temporally distant. This may be infeasible in some cases and affect the output of these models. Further, even with the use of the encoding of time, the task of capturing all sorts of displacements over any range of time (short or long) makes the learning task difficult and challenging.

Overview of AI Image Processing System for the Process of Rendering Dynamic Scenes from Novel View Angles According to Present Disclosure Pursuant to embodiments of the present disclosure, the AI image processing system 102 is provided for performing the process of rendering 2D image 214 of a dynamic scene based on the 3D scene 202 or scene images. The system 102 is configured to render the 2D image 214 from novel view angles and perspective that is not captured by the 3D scene 202. As an example, the 2D image 214 may include an object, such as dynamically moving objects in the dynamic scene, captured from a novel perspective and view angle.

Embodiments of the present disclosure are based on a realization that a task of deforming a 3D volume can be considered as a deformation of a collection of points, sampled in 3D space. Further, a deformation of a 3D point over time, such as the point 338 may amount to estimating a vector that connects the 3D point 338 at a location in a current time-step to its location in a canonical frame timestep. Subsequently, the vector may be decomposed using a piecewise linear function into different segments or pieces, such that each of the segments represent a displacement of the point 338 between two consecutive time steps.

Figure 5A:
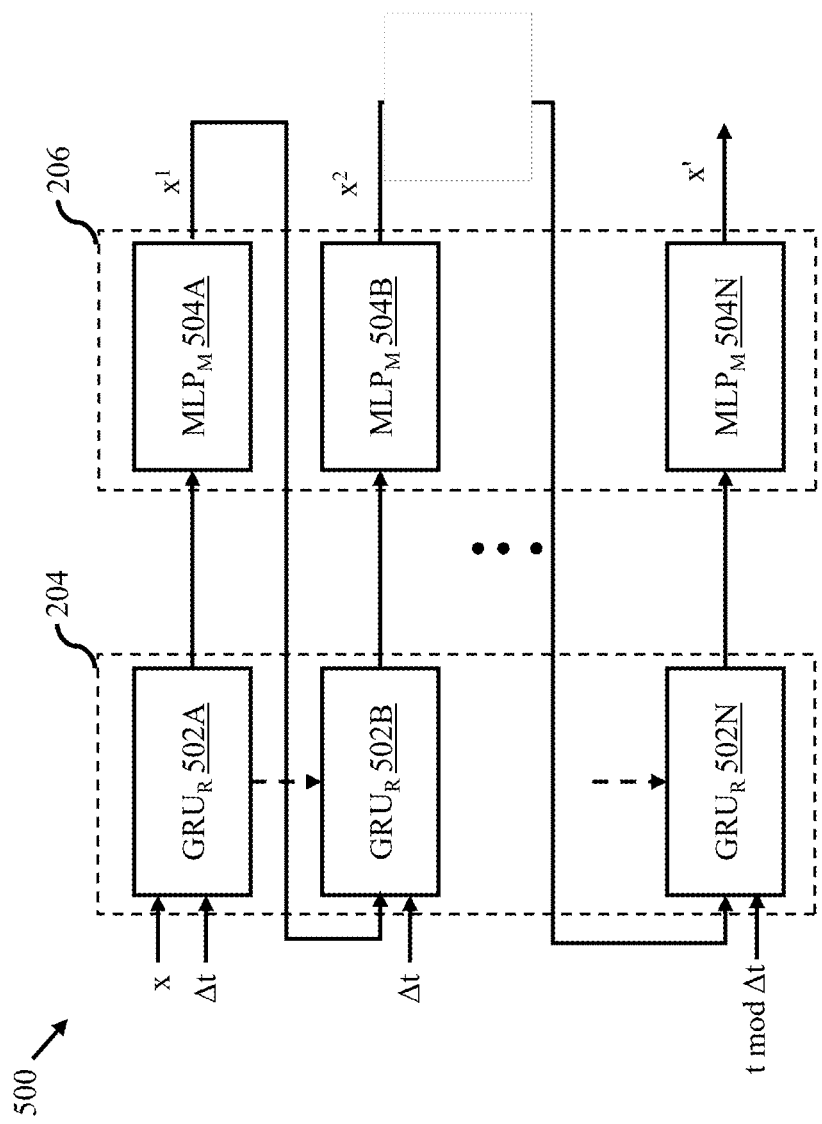
FIG. 5A illustrates an example block diagram of an architecture of a displacement network of the system, according to one or more embodiments.
Figure 5B:
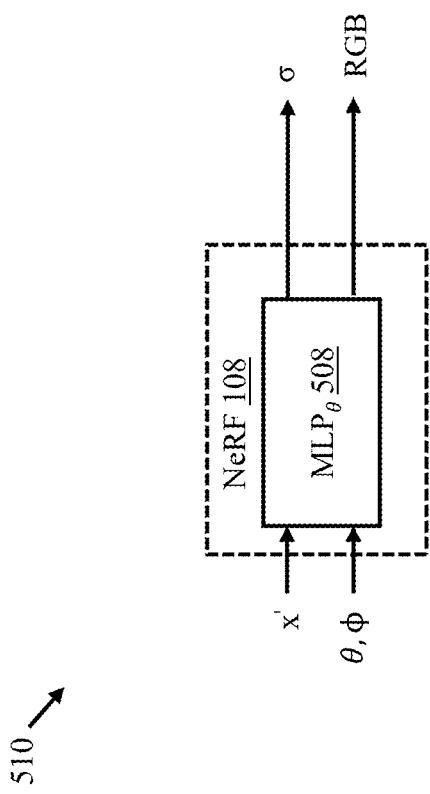
FIG. 5B illustrates an example architecture of a rendering network, according to one or more embodiments.

FIGS. 5A and 5B collectively illustrate a block diagram of an architecture of the AI image processing system 102, according to some embodiments of the present disclosure. As an example, the AI image processing system 102 comprises the RNN 204, the FCNN 206 and the NeRF 108. To this end, the RNN 204 and the FCNN 206 may implement a deformation or displacement network for displacing the point 338 of the 3D scene 336 or 202. Further, the NeRF 108 may implement a rendering network for rendering the displaced point 210 in the 2D image 214 of the dynamic scene.

Referring to FIG. 5A, an example block diagram 500 corresponding to an architecture of a displacement network of the system 102 is shown, according to some embodiments. As mentioned above, the displacement network is implemented using RNN 204 and FCNN 206. For example, the RNN 204 is implemented using GRUs and the FCNN 206 is implemented using MLPs.

According to an embodiment of the present disclosure, the RNN 204 includes a plurality of GRUs, depicted as GRUs 502A, 502B, ..., 502N (collectively referred to as, GRUs 502). Similarly, the FCNN 206 includes a plurality of MLPs, depicted as MLPs 504A, 504B, ..., 504N (collectively referred to as, MLPs 504).

To implement the displacement network of the system 102, the GRUs 502 are implemented to keep a track of history of the displacement of the point 338 in past frames or previous time horizons, so that future displacement predictions of the point 338 respects the motion hitherto determined. Further the ability of a GRU to capture temporal dependencies is leveraged by using the same GRU unit over each of the steps or GRUs 502A, 502B, ..., 502N. This also helps with parameter efficiency, since only the weights of this shared GRU need to be learned during training. Likewise, for reasons of parameter efficiency, the MLPs 504A, 504B, ..., 504N are implemented using a single MLP.

The MLP of the displacement network of the system 102 predicts a displacement of the 3D point 338 over different hops of time.

As described in FIG. 4, a key feature of the deformation network 402 based approaches for rendering dynamic scenes from novel views is that they directly estimate a displacement of a 3D point over an entire time span until the timestep of interest. This poses challenges due to the necessity of learning a wide range of motions over long spans of time that may be executed by objects in the dynamic scene, especially for rendering an image or a frame for a far time horizon.

In particular, the deformation network, $\psi_t$, necessitates to learn a wide variety of motion patterns corresponding to different objects in the scene, over different spans of time, which is challenging owing to the large variance of possible outputs given a scene. For instance, say a point represents a location on a car in the real world. Given a unit of time, say $\Delta t$ sec, the point could be moving very fast or slow in the 3D world, depending on the motion of the car. On the other hand, if the point represents a location on a tree, then it would likely remain in the same 3D coordinate over any length of time. Such a wide range of possibilities makes training $\psi_t$ difficult.

Accordingly, to overcome the problems associated with the training of the deformation networks, a novel displacement network architecture is provided. The proposed displacement network works by splitting a prediction horizon for which a point is to be deformed, into time horizons of a shorter, fixed length time-window and a residual time horizon capturing the remaining time. For example, fixed length time-window of each of the time horizons may be indicated as $\Delta t$ sec, and a residual time horizon may be represented as $\leq \Delta t$ or t mod $\Delta t$ sec. For example, each time horizon may form a time step. Subsequently, the RNN 204 and the FCNN 206 may determine a displacement of the point for each time horizon or time step.

In operation, the displacement network operates by segmenting a length of the prediction horizon {1, . . . , t} indicated by the timestep of interest, t, into time horizons of fixed length indicating the number of time steps. Subsequently, each of the time steps except a residual time step or a last time step may span for a time horizon of $\Delta t$ sec, and the residual time step may span of a residual amount of time, i.e., $\leq \Delta t$ sec.

As an example, the RNN 204 may include a GRU 502, unrolled for a fixed number of timesteps, such that the number of timesteps is determined based on a maximum length of the prediction horizon {1, . . . , t}. As an example, the number of times the MLP 504 is evoked is determined based on the number of timesteps or a number of segments in which the prediction horizon until the time instance of interest is divided.

For each time step or a time horizon until the time instance of interest is reached, the RNN 204 and the FCNN 206 are executed recursively. To this end, each recursion operates on a time horizon of $\Delta t$ sec. It may be noted, that if the length of the time horizon, $\Delta t$ sec is greater than the maximum length of the prediction horizon {1, . . . , t}, then the recursion operates just once with a timestep of t mod $\Delta t$ sec. It may be noted, the time instance of interest is a time instance at which an image, such as the image 214 of a dynamic scene is to be rendered, from a novel view angle.

As an example, during a first iteration, the GRU 502A and the MLP 504A are executed for a first time step to generate a displacement of the point 338 after the first time step. Subsequently, after the first iteration, a displacement of the point is determined indicating how much the point is displaced in the first iteration. The displaced point determined in the first iteration is then used as an input for a second iteration. In the second iteration, the GRU 502B and the MLP 504B are executed for a second time step to generate another displacement of the point after the second time step. This process is repeated until the time instance of interest is reached. To this end, a displacement that is determined during a current iteration is provided as an input to a subsequent iteration until the time instance of interest is reached. In this manner, the displacements of the point over a number of time steps are produced. In operation, in order to make the model parameter efficient, one can use the same GRU and MLP models, across the different timesteps.

For a current iteration, a GRU is configured to determine the motion information 208 for the point based on the coordinates of the point and a current time horizon, $\Delta t$ sec. Further, for the current iteration, an MLP is configured to determine or produce a displacement for the point over the current time horizon based on the motion information 208. As an example, based on the motion information 208, the displacement for the point from the current coordinates of the point to another coordinates are produced. As an example, the current coordinates of the point may vary from another coordinates when the point corresponds to a dynamic object in the scene. Alternatively, the current coordinates of the point may not vary or change slightly from another coordinates when the point corresponds to a static or stationary object in the scene.

As an example, a displacement of the coordinates, x, of the point for the current iteration is produced by the MLP based on motion information produced by the GRU. In this regard, the system that combines GRU and the MLP is denoted as, $G_S$, with learnable parameter set S. Subsequently, in the displacement network, a forward pass through the displacement network for the first time step maybe represented as:

$$G_S: (x, \Delta t) \rightarrow x^1 \qquad (10)$$

where x indicates coordinates of the point in the 3D scene 202 and $\Delta t$ is the time horizon for the first timestep. Similarly, for a subsequent timestep, such as from the second time step until a penultimate time step, i.e., a time step before the residual time step or a second last time step, the forward pass through the displacement network maybe represented as:

$$G_S: (x^{i-1}, \Delta t) \rightarrow x^i, i \in 2, 3, \ldots, \left\lfloor \frac{t}{\Delta t} \right\rfloor \qquad (11)$$

Further, for a last time step or the residual time step, the forward pass through the displacement network maybe represented as:

$$G_S: (x_t, t') \rightarrow x^n \text{ where} \qquad (12)$$
$$k = \left\lfloor \frac{t}{\Delta t} \right\rfloor,$$

and t'=t mod $\Delta t$

As an example, at each iteration, the GRU 502 keeps track of the past displacements of the point. In particular, the GRU for a current iteration or time step may receive a displacement from a previous time horizon or iteration. The GRU may generate motion information for the current iteration based on the previous displacement or a displaced point that is displaced based on a displacement produced in the previous iteration(s). Subsequently, the MLP for the current iteration may receive the motion information generated by the GRU for the current iteration. Based on the received motion information, the MLP may generate a displacement of the point.

In this manner, the GRU and the MLP may operate recursively at each iteration to generate a displacement for the corresponding iteration. For example, the displacement of the point that is determined during the current iteration is inputted to another GRU in a subsequent iteration. For example, an output or the displacement of the point at the current iteration is a function of an input for the current iteration and a hidden state of the GRU 502.

As an example, in addition to the displacement, the subsequent iteration of GRU is also fed with its current hidden state. As an example, the displacement from the current iteration that is fed to the GRU for the subsequent iteration is combined with the hidden state of the GRU for the subsequent iteration using a non-linear mapping. For example, the non-linear mapping allows the GRU to capture complex temporal dependencies between the displacements of the point captured in the previous iterations.

Once the displacements for the point are produced for different time horizons until the time instance of interest is reached, a displaced point, such as the displaced point 210 is determined for the point. The displaced point 210 may indicate a final displacement of the initial point over the prediction horizon so as to correspond to the time instance of interest. As may be understood, the GRUs 502 and the MLPs 504 may operate in different iterations and for corresponding time horizons to determine a displacement.

Based on the displacements produced by the displacement network at each iteration, the displaced point 210 is produced. As an example, a net displacement or displacement coordinates, x', is determined for the point by leveraging the fact that displacement is a vector and can be determined by piecewise displacements over each iteration for each of time horizons. Based on the net displacement, the displaced point 210 is produced. As an example, the displaced point 210 is displaced to a new location or coordinates that may be different from coordinates of the point in the 3D scene or coordinates of the point determined in the previous iteration.

Thereafter, when the determination of the displaced point 210 is complete, the produced displaced point 210 is fed to the rendering network. It may be noted, displaced positions of each point in the 3D scene 202 are generated, for example, using the displacement network described herein. Subsequently, displaced points of the 3D scene 202 are fed to the rendering network to allow the rendering network to generate novel views or images or frames of the dynamic scene. As an example, the rendering network is implemented using NeRF 108.

Details of the rendering network or the NeRF are described in conjunction with, for example, FIGS. 3C and 5B.

Referring to FIG. 5B, an example architecture 510 of a rendering network is illustrated, according to some embodiments. As an example, the rendering network is implemented using the NeRF 108. For example, the displaced point 210 is fed to the NeRF for forward pass with learnable parameters, $\Theta$.

As an example, to render the displaced point 210, the NeRF 108 is configured to receive a view angle of interest 212. For example, the view angle of interest 212 may be a desired view angle or a desired perspective from which the dynamic scene is to be rendered. As an example, the view angle of interest 212 is received from a user of the system 102, and/or an upstream process associated with gaming, AR/VR display, video playback, etc.

Further, based on the received view angle of interest 212, the NeRF 108 is trained to implicitly represent 3D geometry and appearance of the 3D scene. Moreover, the NeRF 108 is trained to learn a continuous 3D function, $F_\Theta$, with learnable parameters, $\Theta$, based on the view angle of interest 212 and a set of visible parameters of the displaced point 210. Examples of the visible parameters of the displaced point 210 may include, but are not limited to, 3D coordinates, surface normals, material properties, illumination, depth information, visibility or occlusion information, color or radiance, opacity, or transparency, and/or motion information.

As an example, the NeRF 108 is trained to implicitly represent the 3D geometry of the 3D scene by modeling a volumetric rendering of the 3D scene 202 as a continuous function. For example, the NeRF 108 is trained on the 3D scene 202, such as images of the 3D scene 202 to learn parameters of volumetric representation of the 3D scene 202. In this regard, the NeRF 108 may learn mapping between 3D spatial coordinates, the viewing direction such as (x,y,z,$\theta$, $\phi$) and radiance values, such as color, c, and opacity values, $\sigma$, without explicitly representing the 3D geometry in a traditional sense, such as using meshes or voxels. This allows the NeRF 108 to handle complex and detailed scenes with fine-grained structures.

As an example, the NeRF 108 is configured to define a continuous volumetric function, F, that takes a 3D spatial coordinate, x, as input and outputs the radiance values, i.e., color, c, and opacity values, $\sigma$. As an example, the NeRF 108 may use ray parameterization to represent points, such as the point 338 or the displaced point 210 along a ray that passes through the scene 336. As an example, the NeRF 108 may include a multilayer perceptron (MLP) 508. For example, for the displaced point 210 along the ray, the MLP 508 of the NeRF 108 is configured to evaluate the 3D function, $F_\Theta$, to obtain radiance and opacity values in a view dependent manner, such as based on the view angle of interest 212.

As an example, the MLP 508 is used to model the 3D function of the NeRF 108 that maps 3D spatial coordinates to radiance and opacity values. For example, the MLP 508 may enable implicit representation of the 3D scene. As may be noted, the NeRF 108 aims to estimate the continuous volumetric function that represents the radiance and opacity values for the scene. The 3D function, denoted as, $F_\Theta$, is implemented as the MLP 508 in the NeRF 108. An input to the MLP 508 is the 3D spatial coordinate of a point in the scene, particularly, the coordinate x' for the displaced point 210. The MLP 508 takes this input and processes it through multiple layers to capture complex non-linear relationships. For example, the MLP 508 may include several hidden layers, each with a set of learnable weights and biases. The number of layers and the size of each layer are hyperparameters that can be adjusted based on the complexity of the scene and the desired model capacity. Furthermore, MLP 508 may utilize non-linear activation functions, such as the ReLU, hyperbolic tangent (tanh) or sigmoid, after each layer of the MLP to introduce non-linearity, allowing the MLP 508 to capture intricate patterns in the input data.

Thereafter, an output layer of the MLP 508 may produce a radiance or color value and an opacity or transparency value for the given 3D displaced point 210. This output represents the color and opacity of the displaced point 210 in the scene accounted from the view angle of interest 212. In certain cases, separate MLPs are used for modeling color and transparency values.

As an example, parameters of the MLP 508 are trained using supervised learning on a dataset containing 3D spatial coordinates and corresponding ground truth radiance values. The training process involves minimizing a loss function that measures a difference between predicted and ground truth radiance values. Further, during both training and inference, the NeRF uses ray marching to sample displaced points along a ray passing through the scene. At each sampled point, the MLP 504 is evaluated to obtain radiance and opacity values, and these values are integrated along the ray to generate the final 2D image 214.

The determined radiance and opacity values for the displaced point 210 may account for how the displaced point 210 may appear from the view angle of interest 212. Further, based on the determined radiance and opacity values, the displaced point 210 is rendered, for example, as part of the 2D image 214. In this manner, a novel view or 2D image form a novel view angle for the dynamic scene is generated. The system 102 is executed to perform novel view rendering tasks in efficient and effective manner to generate photorealistic 2D images for dynamic 3D scenes.

Overview of Training the System

Figure 6:
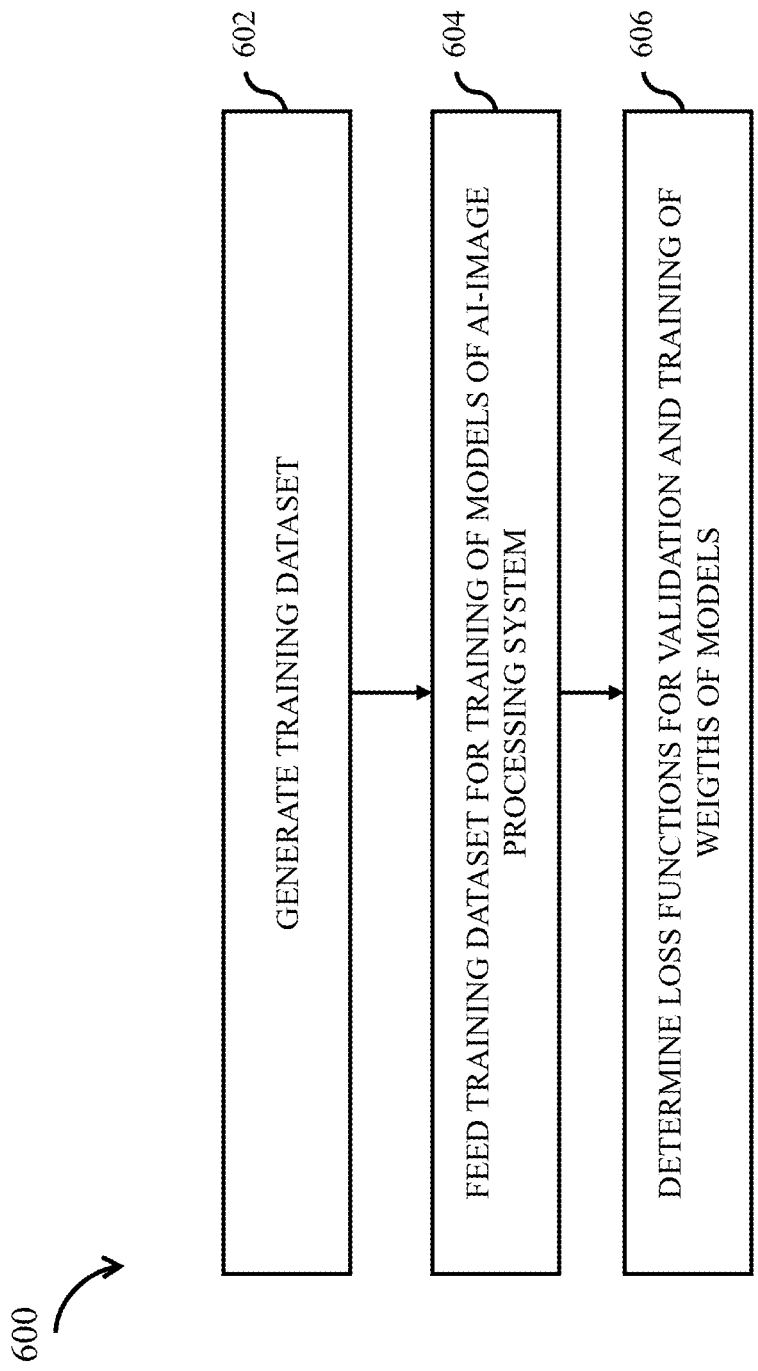
FIG. 6 illustrates an example flowchart of a method for training the system, according to one or more embodiments.

FIG. 6 illustrates an example flowchart 600 of a method for training the system 102, according to some embodiments. Elements of the FIG. 6 are explained in conjunction with FIG. 1, FIG. 2, FIG. 3A, FIG. 3B, FIG. 3C, FIG. 5A and FIG. 5B.

To this end, the system 102 comprises the displacement network, implemented using the GRUs 502 and the MLPs 504, and the rendering network, implemented using the NeRF 108 and the MLP 508. For example, learnable parameters of the GRUs 502 may be indicated by R, and learnable parameters of the MLPs 504 may be indicated by M. The GRUs 502 takes as input the point to be rendered at the time instance of interest and considers its state information to derive temporal context and proceeds to generate its output, i.e., the motion information 208. Further, the MLPs 504 processes the output of the GRUs 502 to predict a location of the point after being displaced, i.e., the displaced point 210, over the length of the prediction horizon including different instances of time until the time instance of interest. The displaced point is then fed to the NeRF 108 or the MLP 508. The learnable parameters of the MLPs 504 may be indicated by $\Theta$. To this end, a total set of learnable parameters, S, for the system 102 is defined by:

$$S = \{\Theta, R, M\}$$

As an example, the displacement network and the rendering network may be trained together using backpropagation through time (BPTT). The models or networks, i.e., the RNN 204 or the GRUs 502, the FCNN 206 or the MLPs 504 and the NeRF 108 or the MLP 508 are trained for optimizing their corresponding learnable model parameters, i.e., R, M, $\Theta$, respectively to accurately represent a 3D scene and generate realistic images from different viewpoints. The training of this system may include the following steps.

At 602, a training dataset is generated. As an example, the training dataset is generated based on gathering a dataset containing pairs of 3D scenes and corresponding images captured from various viewpoints. As an example, the training dataset may be divided into at least two sets corresponding to training and testing or validation stages, based on viewpoints. The training set would typically contain more than one viewpoint while the test set would contain the viewpoints not contained in the training set.

At 604, the training dataset is fed to the system for training. In this regard, the training dataset is processed by the displacement network and the rendering network in conjunction or independently. For example, the training dataset is processed in conjunction for training of all of the models using BPTT. Based on the processing, learnable parameters of each of the models are defined and/or updated.

As an example, the training dataset is pre-processed to associate each point in the scene in the training dataset with its corresponding features, such as color, transparency, or other relevant parameters.

At 606, loss functions are determined for computation of the gradients and for validation of the learnable weights of each of the models. As an example, a loss function may measure a difference between predictions made by the rendering model and the ground truth images. For example, the predictions are made by each model for the validation set, based off of the views provided in the training dataset. Likewise, such predictions can also be made for the views provided in the training set itself in order to compute the gradients. Examples of loss functions may include, but are not limited to, mean squared error (MSE), perceptual loss, or adversarial loss.

The loss function is computed only for the image finally rendered by the system 102 and compared against ground truth images captured from the viewpoints for which the prediction is performed. To this end, based on the loss functions, the learnable weights or model parameters of each of the models, i.e., RNN 204, FCNN 206 and NeRF 108, are updated to optimize operation, and improve accuracy of the system 102.

Figure 7:
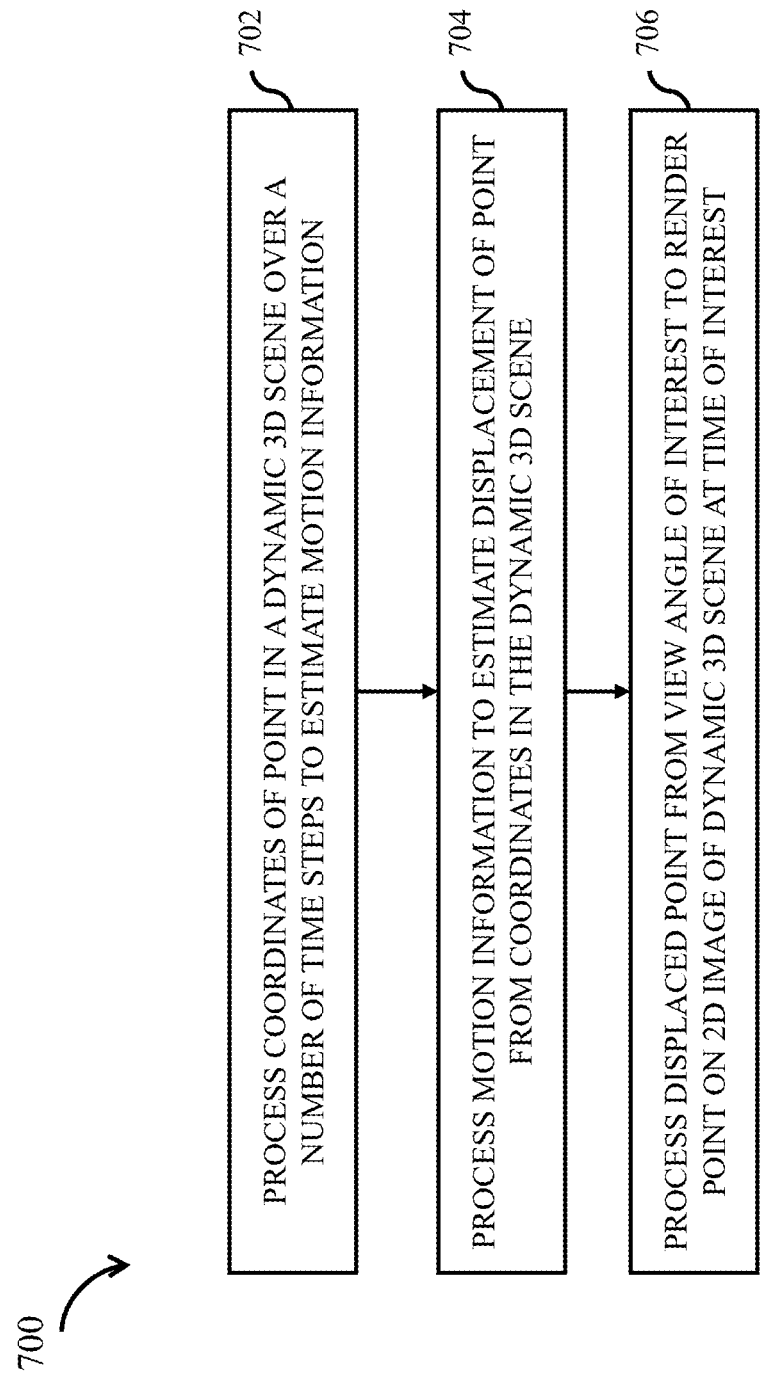
FIG. 7 illustrates an example flowchart of a method for generating an image for a dynamic scene, according to one or more embodiments.

As an example, an optimization function, such as stochastic gradient descent (SGD) or adaptive moment estimation function (Adam) may be used to minimize the determined loss function. For example, the optimization function may operate by adjusting learning rates and other hyperparameters for efficient convergence, Overview of Steps for Generating 2D Image of a Dynamic Scene Form Novel View Angle FIG. 7 illustrates an example flowchart 700 of a method for generating an image for a dynamic scene, according to some embodiments. Elements of FIG. 7 are explained in conjunction with elements of FIG. 1, FIG. 2, FIG. 3A, FIG. 3B, FIG. 3C, FIG. 5A, FIG. 5B and FIG. 6.

At 702, coordinates of a point in a dynamic 3D scene are processed. As an example, the coordinates, x, of the point are fed to the RNN 204 for processing. For example, the RNN 204 may process the coordinates of the point over a number of time steps indicated by a time instance of interest, t, to produce motion information 208 of the point at the time instance of interest. As an example, a length of time until the time instance of interest, t, is divided or segmented into time horizons where each time horizon may correspond to one time step. Subsequently, in each iteration, such as a current iteration, the RNN 204 or a GRU may process the coordinates of the point to generate motion information for corresponding time horizon, i.e., one time step.

At 704, the motion information 208 is processed to produce a displacement of the point from the coordinates in the dynamic 3D scene 202. As an example, motion information 208 is processed by the FCNN 206 or an MLP. For example, based on the motion information determined by the GRU for the current iteration, the MLP may produce displacement of the point in the scene. As an example, the displacement is generated in terms of coordinates in the 3D scene 202. For example, after a first iteration, the displacement determined by the MLP may indicate displacement of the point from the input 3D scene 202. For example, in subsequent iterations, the displacement determined by the MLP may indicate displacement of the point from previous determined displacements.

It may be noted, for a subsequent iteration after the current iteration, the displacement of the point determined by the FCNN 206 or the MLP in the current iteration is given as input to the RNN 204 or a GRU for the subsequent iteration to determine motion information for the subsequent iteration. For example, an output of the GRUs 502, say an output or motion information 208 of the GRU at the current iteration is a non-linear function of a weighted sum of a current input and a hidden state at the current iteration. In other words, at the current iteration, j, the GRU is configured to generate the output based on the application of the non-linear function on the weighted sum of the input (for example, coordinates, x, of the point from the static 3D scene 202 or coordinates, $x^{j-1}$, based on the displacement determined by an MLP in a previous iteration) fed to the GRU in the current iteration as well as the hidden state, $h_{j-1}$ of the GRU at the current iteration.

At 706, a displaced point is processed from a view angle of interest 212. In particular, once the displacements are determined for each time step or time horizon spanning across the entire length of the prediction horizon, a net displacement for the point is determined. Based on the net displacement and coordinates of the point in the 3D scene 202, the displaced point 210 is produced, for example, in the last iteration by the $MLP_N$.

Thereafter, the displaced point 210 is fed to the NeRF 108. The NeRF 108 may also receive the view angle of interest 212, and further process the displaced point 210 based on the view angle of interest 212 to render the point on the 2D image 214 of the dynamic 3D scene for the time instance of interest. In particular, the NeRF 108 is trained for the 3D scene 202.

Overview of an Example Diagram of System

Figure 8:
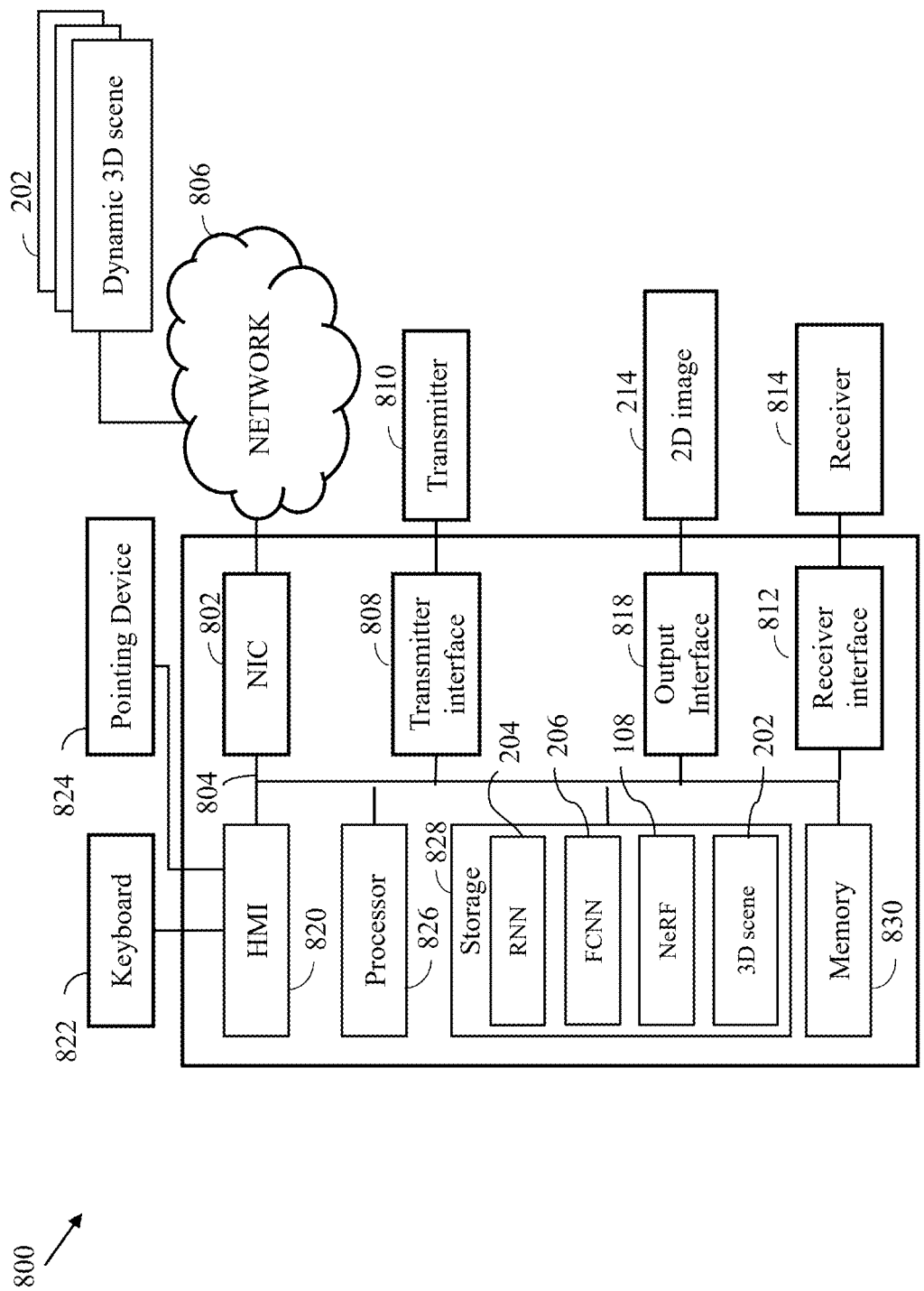
FIG. 8 shows a block diagram of the system, in accordance with some embodiments.

FIG. 8 shows a block diagram 800 of the system 102 in accordance with some embodiments. The system 102 may include a number of interfaces connecting the system 102 with other systems and devices. In this regard, a network interface controller (NIC) 802 is configured to connect the system 102 through the bus 804 to a network 806 connecting the system 103 with sensing devices (not shown). For example, the system 102 includes a transmitter interface 808 configured to command to a transmitter 810 to emit a pulse wave. Using a receiver interface 812 connected to a receiver 814, the system 102 may receive the 3D scene 202 or 336, such as images or image sequences of a dynamic scene. In some implementations, the system 102 receives the information about the static 3D scene 202 through the network 806.

The system 102 includes the output interface 818 configured to render the 2D image 214 for the dynamic scene or an object of the dynamic scene. For example, the output interface 818 may display the 2D image 214 on a display device, store the image 214 into a storage medium and/or transmit the image 214 over the network 806. For example, the system 102 may be linked through the bus 804 to a display interface adapted to connect the system 102 to a display device, such as a computer monitor, camera, television, projector, or mobile device, among others. The system 102 may also be connected to an application interface adapted to connect the system to equipment for performing various tasks.

In some implementations, the system 102 includes an input interface to receive the 3D scene 202. Examples of the input interface include NIC 802, the receiver interface 812, and a human machine interface (HMI) 820. The HMI 820 within the system 102 connects the system 102 to a keyboard 822 and a pointing device 824, etc., wherein the pointing device 824 may include a mouse, a trackball, a touchpad, a joystick, a pointing stick, a stylus, or a touchscreen, among others.

The system 102 includes a processor 826 configured to execute stored instructions stored in a storage 828, as well as a memory 830 that stores instructions that are executable by the processor 826. The processor 826 may be a single core processor, a multi-core processor, a computing cluster, or any number of other configurations. The memory 830 may include random access memory (RAM), read only memory (ROM), flash memory, or any other suitable memory systems. The processor 826 may be connected through the bus 804 to one or more input and output devices.

The instructions may implement a method for novel view rendering of a scene, such as a dynamic and/or a static scene, using the RNN 204, the FCNN 206 and the NeRF 108. The instructions may include the trained neural networks, i.e., RNN 204, the FCNN 206 and the NeRF 108 for determining displacement of the point and new view of the point for rendering the point in the image 214.

The above-described embodiments of the present invention can be implemented in any of numerous ways. For example, the embodiments may be implemented using hardware, software, or a combination thereof. When implemented in software, the software code can be executed on any suitable processor or collection of processors, whether provided on a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, it can be understood by one of ordinary skills in the art that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An artificial intelligence (AI) image processing system employing a neural radiance field (NeRF) to render a two-dimensional (2D) image of a dynamic three-dimensional (3D) scene from different view angles and different instances of time based on an implicit representation of the 3D scene, the AI image processing system comprising: at least one processor and a memory having instructions stored thereon that cause the at least one processor of the AI image processing system to:
  process coordinates of a point in a dynamic 3D scene with a recurrent neural network over a number of time steps indicated by a time instance of interest to produce motion information of the point at the time instance of interest;
  process the motion information with a fully connected neural network to produce a displacement of the point from the coordinates in the dynamic 3D scene; and
  process a displaced point from a view angle of interest with the NeRF trained for a static 3D scene to render the point on the 2D image of the dynamic 3D scene of the time instance of interest, wherein the displaced point is generated based on the displacement of the point.

2. The AI image processing system of claim 1, wherein the recurrent neural network and the fully connected neural network are executed recursively for different instances of time until the time instance of interest is reached, such that a displacement of the point determined during a current iteration is an input to a subsequent iteration.

3. The AI image processing system of claim 1, wherein the recurrent neural network includes gated recurrent units (GRUs), and wherein execution of each of the GRUs corresponds to a motion of the point at a time step.

4. The AI image processing system of claim 3, wherein
  the recurrent neural network includes a fixed number of iterations of the gated recurrent units (GRUs) defining a maximum length of a prediction horizon, and
  the recurrent neural network and the fully connected neural network are executed recursively for different instances of time until the time instance of interest is reached, such that a displacement of the point determined during a current iteration is an input to a subsequent iteration.

5. The AI image processing system of claim 4, wherein each recursion operates on a time horizon with a length not greater than the maximum length of the prediction horizon.

6. The AI image processing system of claim 4, wherein the displacement of the point determined during the current iteration is input to the subsequent iteration and is combined with a hidden state at the subsequent iteration using a non-linear mapping.

7. The AI image processing system of claim 4, wherein an output at the current iteration is a function of a current input and a hidden state of the GRUs.

8. The AI image processing system of claim 4, wherein the output of the GRUs at the current iteration is a non-linear function of a weighted sum of a current input and a hidden state at the current iteration.

9. The AI image processing system of claim 1, wherein, the NeRF is trained to:
  implicitly represent 3D geometry and appearance of the 3D scene; and
  learn a continuous 3D function with learnable parameters based on the view angle of interest and coordinates of the displaced point.

10. The AI image processing system of claim 1, wherein the NeRF is trained using backpropagation through time (BPTT).

11. The AI image processing system of claim 1, wherein the recurrent neural network (RNN) is a bi-directional RNN.

12. The AI image processing system of claim 1, wherein rendering the point on the 2D image of the dynamic 3D scene produces a new view of the 3D scene.

13. The AI image processing system of claim 1, wherein the point represents a location of an object in a 3D scene.

14. A method for artificial intelligence (AI)-based image processing, the method being implemented by an AI image processing system employing a neural radiance field (NeRF) to render a two-dimensional (2D) image of a dynamic three-dimensional (3D) scene from different view angles and different instances of time based on an implicit representation of the 3D scene, the method comprising:
  processing coordinates of a point in a dynamic 3D scene with a recurrent neural network over a number of time steps indicated by a time instance of interest to produce motion information of the point at the time instance of interest;
  processing the motion information with a fully connected neural network to produce a displacement of the point from the coordinates in the dynamic 3D scene; and
  processing a displaced point from a view angle of interest with the NeRF trained for a static 3D scene to render the point on the 2D image of the dynamic 3D scene of the time instance of interest, wherein the displaced point is generated based on the displacement of the point.

15. The method of claim 14, wherein the recurrent neural network and the fully connected neural network are executed recursively for different instances of time until the time instance of interest is reached, such that a displacement of the point determined during a current iteration is an input to a subsequent iteration.

16. The method of claim 14, wherein the recurrent neural network includes gated recurrent units (GRUs), and wherein execution of each of the GRUs corresponds to a motion of the point at a time step.

17. The method of claim 16, wherein
the recurrent neural network includes a fixed number of iterations of the gated recurrent units (GRUs) defining a maximum length of a prediction horizon, and
the recurrent neural network and the fully connected neural network are executed recursively for different instances of time until the time instance of interest is reached, such that a displacement of the point determined during a current iteration is an input to a subsequent iteration.

18. The method of claim 17, wherein each recursion operates on a time horizon with a length not greater than the maximum length of the prediction horizon.

19. The method of claim 14, wherein rendering the point on the 2D image of the dynamic 3D scene produces a new view of the 3D scene.

20. A non-transitory computer readable storage medium embodied thereon a program executable by a processor for performing a method, the method comprises:
processing coordinates of a point in a dynamic 3D scene with a recurrent neural network over a number of time steps indicated by a time instance of interest to produce motion information of the point at the time instance of interest, wherein a neural radiance field (NeRF) is employed to render a two-dimensional (2D) image of a dynamic three-dimensional (3D) scene from different view angles and different instances of time based on an implicit representation of the 3D scene;
processing the motion information with a fully connected neural network to produce a displacement of the point from the coordinates in the dynamic 3D scene; and
processing a displaced point from a view angle of interest with the NeRF trained for a static 3D scene to render the point on the 2D image of the dynamic 3D scene of the time instance of interest, wherein the displaced point is generated based on the displacement of the point.

* * * * *